(12) United States Patent
Uechi et al.

(10) Patent No.: US 11,408,339 B2
(45) Date of Patent: Aug. 9, 2022

(54) STEAM TURBINE SYSTEM AND COMBINED CYCLE PLANT

(71) Applicant: MITSUBISHI HEAVY INDUSTRIES, LTD., Tokyo (JP)

(72) Inventors: Hideyuki Uechi, Tokyo (JP); Tatsuo Ishiguro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 127 days.

(21) Appl. No.: 16/632,104

(22) PCT Filed: Aug. 30, 2018

(86) PCT No.: PCT/JP2018/032146
§ 371 (c)(1),
(2) Date: Jan. 17, 2020

(87) PCT Pub. No.: WO2019/044984
PCT Pub. Date: Mar. 7, 2019

(65) Prior Publication Data
US 2020/0165971 A1 May 28, 2020

(30) Foreign Application Priority Data
Aug. 31, 2017 (JP) .............................. JP2017-167820

(51) Int. Cl.
*F02C 6/18* (2006.01)
*F01D 15/00* (2006.01)
(Continued)

(52) U.S. Cl.
CPC ................ *F02C 6/18* (2013.01); *F01D 15/00* (2013.01); *F01K 23/10* (2013.01); *F02C 3/04* (2013.01); *F02C 7/143* (2013.01); *F02G 5/02* (2013.01)

(58) Field of Classification Search
CPC ...... F02C 3/04; F02C 6/18; F02C 7/14; F02C 7/143; F01D 15/00; F01K 23/10;
(Continued)

(56) References Cited

U.S. PATENT DOCUMENTS 5,386,685 A * 2/1995 Frutschi ................ F01K 23/106
60/39.182
5,555,723 A * 9/1996 Dowdy .................. F01K 23/062
60/39.182

(Continued)

FOREIGN PATENT DOCUMENTS

CN 102235239 A 11/2011
CN 103282606 10/2015
(Continued)

OTHER PUBLICATIONS

International Search Report dated Nov. 6, 2018 in International (PCT) Application No. PCT/JP2018/032146.
(Continued)

*Primary Examiner* — Loren C Edwards
(74) *Attorney, Agent, or Firm* — Wenderoth, Lind & Ponack, L.L.P.

(57) ABSTRACT

A steam turbine system (200) includes a steam turbine (60) in which a main flow path (C) through which a main steam flows is formed, and a saturated steam generation portion (210) that is configured to generate a saturated steam. The saturated steam generation portion (210) is configured to feed the saturated steam into a wet region (C1) in which the main steam in the main flow path (C) is in a wet state via a hollow portion formed inside a stator vane (650) of the steam turbine (60). The stator vane (650) has a plurality of supply ports that are formed such that the hollow portion is configured to communicate with the main flow path (C), and a discharge amount of the saturated steam increases from an
(Continued)

inner circumferential side toward an outer circumferential side in a blade height direction.

18 Claims, 8 Drawing Sheets

(51) Int. Cl.
  *F01K 23/10* (2006.01)
  *F02C 3/04* (2006.01)
  *F02C 7/143* (2006.01)
  *F02G 5/02* (2006.01)
(58) Field of Classification Search
  CPC ...... F01K 23/101; F01K 23/106; F01K 27/02; F02G 5/02; Y02E 20/16; F22B 1/1815
  See application file for complete search history.

(56) References Cited

U.S. PATENT DOCUMENTS

| | | | |
|---|---|---|---|
| 2005/0039461 A1* | 2/2005 | Ahrens-Botzong | F01K 23/10 60/772 |
| 2008/0190106 A1 | 8/2008 | Mak | |
| 2012/0251304 A1 | 10/2012 | Maruyama | |
| 2016/0138428 A1 | 5/2016 | Gardiner et al. | |
| 2016/0273410 A1 | 9/2016 | Grau Sorarrain et al. | |
| 2017/0051636 A1 | 2/2017 | Hoshino et al. | |
| 2017/0152765 A1 | 6/2017 | Uechi et al. | |
| 2018/0045080 A1 | 2/2018 | Uechi et al. | |

FOREIGN PATENT DOCUMENTS

| | | |
|---|---|---|
| DE | 10 2009 037 411 | 5/2011 |
| JP | 50-095641 | 7/1975 |
| JP | 54-008244 | 1/1979 |
| JP | 59-082501 | 5/1984 |
| JP | 60-069221 | 4/1985 |
| JP | 04-014703 | 2/1992 |
| JP | 06-042703 | 2/1994 |
| JP | 06-146815 | 5/1994 |
| JP | 06-221114 | 8/1994 |
| JP | 07-034804 | 2/1995 |
| JP | 08-014001 | 1/1996 |
| JP | 10-311206 | 11/1998 |
| JP | 2001-241304 | 9/2001 |
| JP | 2008-506883 | 3/2008 |
| JP | 2011-196191 | 10/2011 |
| JP | 2014-185550 | 10/2014 |
| JP | 2015-004300 | 1/2015 |
| JP | 2015-183590 | 10/2015 |
| JP | 2015-183597 | 10/2015 |
| JP | 2016-156356 | 9/2016 |
| JP | 2017-040201 | 2/2017 |
| JP | 2017-504761 | 2/2017 |
| WO | 00/12871 | 3/2000 |
| WO | 2016/148008 | 9/2016 |

OTHER PUBLICATIONS

Written Opinion of the International Searching Authority dated Nov. 6, 2018 in International (PCT) Application No. PCT/JP2018/032146.

* cited by examiner

STEAM TURBINE SYSTEM AND COMBINED CYCLE PLANT

TECHNICAL FIELD

The present invention relates to a steam turbine system and a combined cycle plant.

Priority is claimed on Japanese Patent Application No. 2017-167820, filed on Aug. 31, 2017, the content of which is incorporated herein by reference.

BACKGROUND ART

A combined cycle plant including a gas turbine and a steam turbine is coupled to an exhaust heat recovery boiler in order to effectively use heat of an exhaust gas that is exhausted from the gas turbine.

As such a combined cycle plant, for example, there is a plant disclosed in Patent Document 1. The plant disclosed in Patent Document 1 is provided with an exhaust heat recovery device as an exhaust heat recovery boiler for effectively using heat of an exhaust gas. The exhaust heat recovery device includes a superheater, an evaporator, and an economizer. In the exhaust heat recovery device, a high temperature exhaust gas is supplied in an order of the superheater, the evaporator, and the economizer, and thus a high-temperature and high-pressure steam is generated by using heat of the exhaust gas to be supplied to a steam turbine. In the exhaust heat recovery device, part of hot water generated in the economizer is supplied to a flasher, and thus a low-pressure steam is generated. The low-pressure steam generated in the flasher is supplied to an intermediate stage of the steam turbine to be used to drive the steam turbine.

CITATION LIST

Patent Literature

[Patent Document 1] Japanese Unexamined Patent Application, First Publication No. 2011-196191

SUMMARY OF INVENTION

Technical Problem

Meanwhile, in the steam turbine used in the plant, a pressure becomes considerably low toward a final stage thereof, and fine water droplets (drains) are generated in a main steam flowing through a main flow path. A large number of fine water droplets flow through the main flow path along with the steam, but some thereof are attached to a blade surface to form a liquid film. The liquid film moves to a rear edge of the blade, and becomes a rough water droplet again in the main flow path to scatter, and then the water droplet collides with rotor blades rotated at a high speed. Consequently, erosion occurs in which the blade surface is eroded. Thus, in the steam turbine, there is the desire to limit the occurrence of such erosion.

The present invention provides a steam turbine system and a combined cycle plant capable of limiting the occurrence of erosion.

Solution to Problem

A steam turbine system related to a first aspect of the present invention includes a steam turbine in which a main flow path through which a main steam flows is formed; and a saturated steam generation portion that is configured to generate a saturated steam, and is configured to feed the saturated steam into a wet region in which the main steam in the main flow path is in a wet state via a hollow portion formed inside a stator vane of the steam turbine, in which the stator vane has a plurality of supply ports that are formed at a front edge portion of the stator vane such that the hollow portion is configured to communicate with the main flow path, and discharge the saturated steam to the main flow path, and in which the plurality of supply ports are formed such that a discharge amount of the saturated steam increases from an inner circumferential side of the stator vane toward an outer circumferential side thereof in a blade height direction.

With this configuration, the saturated steam is supplied to the wet region of the main flow path of the steam turbine from the saturated steam generation portion. The saturated steam is fed into the wet region, and thus the saturated steam is mixed with main steam in the wet region. In the wet region, the main steam is subjected to a reduction of the dryness to become a wet steam, but is mixed with the saturated steam to be subjected to an increase of the dryness, and thus a heat quantity (entropy) thereof is increased. As a result, it is possible to limit the occurrence of a drain in the wet region or the downstream region of the wet region. The amount of the saturated steam flowing in the wet region is more on the outer circumferential side than on the inner circumferential side in the blade height direction. As a result, in the wet region, the saturated steam is intensively supplied to, especially, the tip end of the rotor blade that is easily influenced by erosion. Therefore, in the rotor blade, it is possible to limit the occurrence of a drain at, especially, the tip end in which erosion easily occurs.

According to the steam turbine system related to a second aspect of the present invention, in the first aspect, the plurality of supply ports may be formed such that hole diameters thereof increase from the inner circumferential side of the stator vane toward the outer circumferential side thereof in the blade height direction.

According to the steam turbine system related to a third aspect of the present invention, in the first or second aspect, the plurality of supply ports may be disposed such that a gap between the supply ports in the blade height direction is reduced from the inner circumferential side of the stator vane toward the outer circumferential side thereof in the blade height direction.

According to the steam turbine system related to a fourth aspect of the present invention, in any one of the first to third aspects, the saturated steam generation portion may be configured to generate a low-pressure saturated steam fed into the wet region and a high-pressure saturated steam having a pressure higher than a pressure of the low-pressure saturated steam as the saturated steam, and feed the high-pressure saturated steam into an upstream region with respect to the wet region in the main flow path.

A heat quantity (entropy) of the saturated steam is lower than a heat quantity (entropy) of a superheated steam. Thus, in a case where the saturated steam (high-pressure saturated steam) is supplied to the upstream region of the wet region, that is, a superheated region in which the main steam is a superheated steam, the heat quantity (entropy) of the main steam is reduced. As a result, the dryness is also reduced in the downstream wet region, and thus this causes erosion or a reduction of efficiency of the steam turbine. In this case, in a case where the low-pressure saturated steam is fed into the wet region, the dryness of the main steam in the wet region increases. As a result, the reduction of the dryness due to the supply of the high-pressure saturated steam is canceled out, and thus it is possible to limit the occurrence of erosion or a reduction of efficiency of the low-pressure steam turbine.

According to the steam turbine system related to a fifth aspect of the present invention, in any one of the first to fourth aspects, the saturated steam generation portion may be a multi-stage flasher that is configured to convert water a flash steam over a plurality of times while gradually depressurizing the water.

With this configuration, saturated steams having different pressures and temperatures can be fed into the steam turbine. Therefore, a saturated steam corresponding to a pressure of the main steam flowing through the main flow path can be supplied to the steam turbine. Consequently, it is possible to limit the occurrence of erosion and also to limit a reduction of efficiency of the low-pressure steam turbine. Flash steams are generated over a plurality of times while reducing a pressure, and thus supplied water can be used until a temperature of the water becomes low. Thus, heat of the water when a saturated steam is generated can be recovered up to a low temperature, and can be effectively used as a heat source of the steam turbine, and thus it is possible to increase the output of the steam turbine and the efficiency of the system.

According to the steam turbine system related to a sixth aspect of the present invention, in any one of the first to fifth aspects, the saturated steam generation portion may be configured to supply the saturated steam into the main flow path from an upstream side with respect to a rotor blade of the steam turbine toward a tip end of the rotor blade.

With this configuration, a large amount of the saturated steam is supplied to the vicinity of the tip end of the rotor blade. Therefore, in the rotor blade, it is possible to limit the occurrence of a drain at, especially, the tip end in which erosion easily occurs.

According to the steam turbine system related to a seventh aspect of the present invention, in any one of the first to sixth aspects, the saturated steam generation portion may include a flasher that is configured to generate a flash steam by depressurizing water, and the steam turbine system may further include a pressurizer configured to pressurize condensed water generated by the flasher, and a heat source heating the condensed water pressurized by the pressurizer, and the steam turbine system may be configured to return the condensed water heated by the heat source to the flasher.

A combined cycle plant related to an eighth aspect of the present invention includes the steam turbine system according to any one of the first to seventh aspects; a gas turbine; an exhaust heat recovery boiler that is configured to generate steam by using heat of an exhaust gas from the gas turbine; and a water supply system that is configured to supply water to the exhaust heat recovery boiler, in which the steam turbine is driven with the steam generated by the exhaust heat recovery boiler as the main steam, and in which the saturated steam generation portion is configured to generate, as the saturated steam, a flash steam obtained by flashing water generated by the exhaust heat recovery boiler.

With this configuration, it is possible to obtain the saturated steam by using high-temperature water that is heated by using the exhaust gas in the exhaust heat recovery boiler. The high-temperature water is supplied to the saturated steam generation portion, and thus it is possible to easily generate saturated steams corresponding to different pressures and temperatures.

According to the combined cycle plant related to a ninth aspect of the present invention, in the according to the eighth aspect, the exhaust heat recovery boiler may include an economizer that is configured to heat the water supplied from the water supply system with the exhaust gas, an evaporator that is configured to heat the water heated by the economizer with the exhaust gas and thereby generate steam, and a superheater that is configured to superheat the steam generated by the evaporator with the exhaust gas, and the saturated steam generation portion may flash the water supplied from the economizer.

With this configuration, even in a case where a temperature of an exhaust gas supplied to the evaporator is similar to a temperature of the water in the evaporator, and thus heat of the exhaust gas cannot be sufficiently recovered in the exhaust heat recovery boiler, heat of the exhaust gas can be recovered up to a lower temperature by using the saturated steam generation portion. Specifically, water heated by the economizer becomes a saturated steam in the saturated steam generation portion, and the saturated steam is supplied to the steam turbine such that heat of the exhaust gas is recovered as an output of the steam turbine. Therefore, it is possible to more effectively use heat contained an exhaust gas.

According to the combined cycle plant related to a tenth aspect of the present invention, in the ninth aspect, the exhaust heat recovery boiler may include a heat exchanger that is configured to heat the water supplied from the water supply system with the exhaust gas having passed through the economizer and is configured to supply the heated water to the economizer, and the saturated steam generation portion may feed condensed water generated by flashing water to the economizer along with the water supplied from the heat exchanger to the economizer.

With this configuration, it is possible to prevent that the condensed water is returned to the heat exchanger, and thus a temperature of the water supplied to the heat exchanger is increased. Therefore, the temperature of the water supplied to the heat exchanger is reduced, and thus it is possible to increase a heat recovery amount in the heat exchanger, compared with a case where the condensed water is returned to the heat exchanger. Consequently, it is possible to increase a recovery amount of heat contained in the exhaust gas in the heat exchanger and thus to more effectively use the heat.

The combined cycle plant related to an eleventh aspect of the present invention, in any one of the eighth to tenth aspects, may further include a generator that is configured to generate electric power due to driving the steam turbine, the gas turbine may include a compressor that is configured to compress air, a combustor that is configured to burn a fuel in the air compressed by the compressor and thereby generate a combustion gas, and a turbine that is driven with the combustion gas, the water supply system may include a supplied water line through which water from a water source is fed to the exhaust heat recovery boiler, and a supplied water heater that is configured to heat supplied water that is the water flowing through the supplied water line, the supplied water heater may include at least one of an intake air cooler that is configured to subject a first cooling medium cooling the air sucked by the compressor and the supplied water to heat exchange, and thus cool the first cooling medium and heats the supplied water, a gas turbine cooler that is configured to subject a second cooling medium cooling a constituent component of the gas turbine and the supplied water to heat exchange, and thus cool the second cooling medium and heats the supplied water, a lubricant cooler that is configured to subject a lubricant from bearings rotatably supporting a rotor of the steam turbine and the supplied water to heat exchange, thus cools the lubricant and heats the supplied water, and returns the cooled lubricant to the bearings, and a generator cooler that is configured to subject a third cooling medium cooling a constituent component of the generator and the supplied water to heat exchange, and thus cool the third cooling medium and heats the supplied water, and the saturated steam generation portion may feed condensed water generated by flashing water to the exhaust heat recovery boiler along with water supplied from the supplied water heater to the exhaust heat recovery boiler.

With this configuration, heat obtained by cooling the air sucked by the compressor, heat obtained by cooling a constituent component of the gas turbine, heat obtained by cooling a lubricant, or heat obtained by cooling the generator can be effectively used. With this configuration, it is possible to prevent that the condensed water is returned to the supplied water heater, and thus a temperature of the water supplied to the supplied water heater is increased. Therefore, the temperature of the water supplied to the supplied water heater is reduced, and thus it is possible to effectively recover heat even in a case where a temperature of heat recovered in the supplied water heater is low, compared with a case where the condensed water is returned to the supplied water heater.

A combined cycle plant related to a twelfth aspect of the present invention includes the steam turbine system according to the seventh aspect; and a gas turbine, in which the heat source is a gas turbine cooler that is configured to subject the condensed water and a second cooling medium cooling a constituent component of the gas turbine to heat exchange, and thus cool the second cooling medium and heat the condensed water.

Advantageous Effects of Invention

According to the present invention, it is possible to limit the occurrence of erosion.

DETAILED DESCRIPTION OF THE INVENTION

Hereinafter, embodiments of the present invention will be described with reference to the drawings.

First Embodiment

Figure 1:
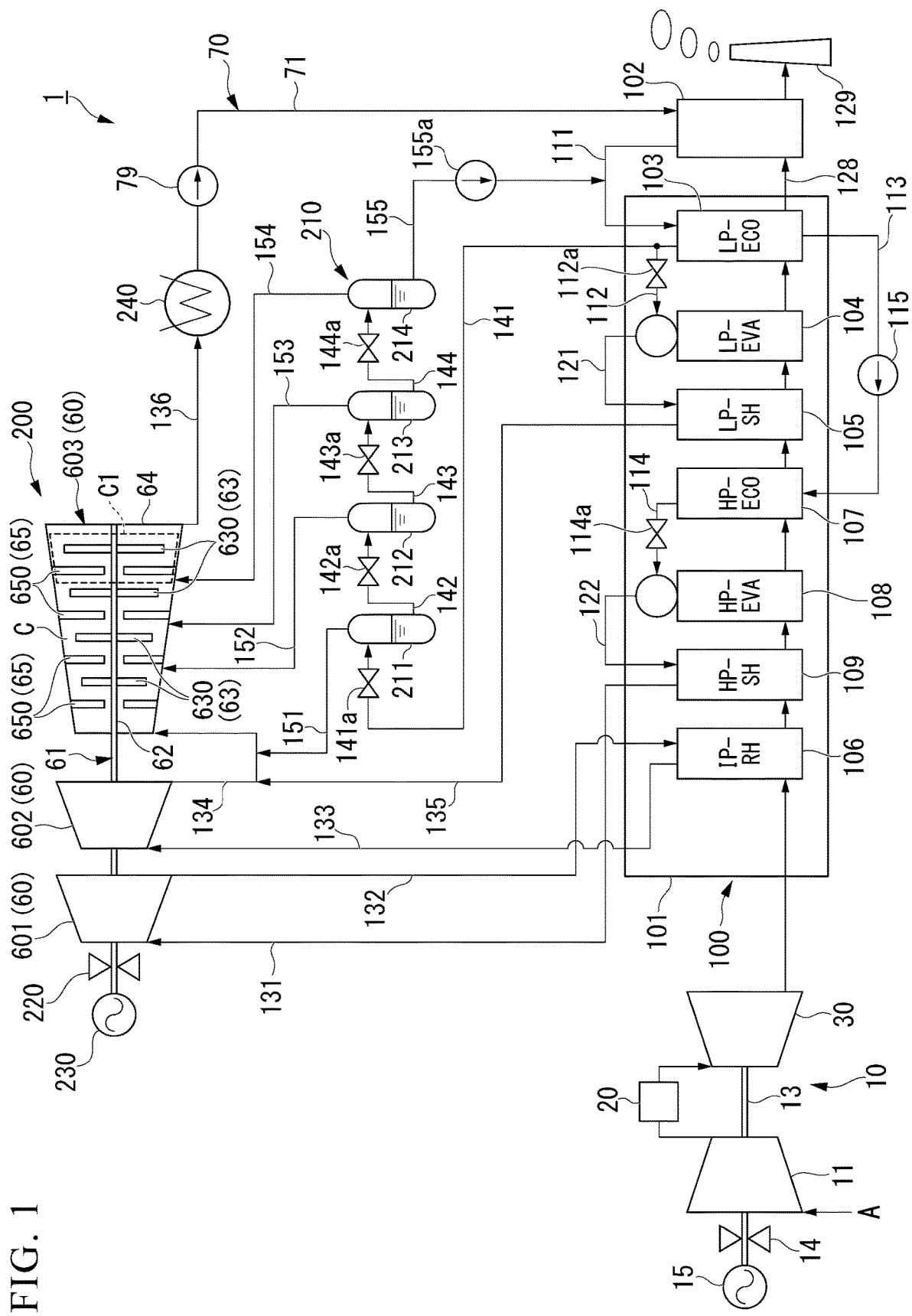
FIG. 1 is a system diagram showing a combined cycle plant in a first embodiment of the present invention.

With reference to FIG. 1, a description will be made of a combined cycle plant 1 according to a first embodiment of the present invention. The combined cycle plant 1 of the present embodiment includes, as shown in FIG. 1, a gas turbine 10, a first generator 15 that is configured to generate electric power due to driving of the gas turbine 10, an exhaust heat recovery boiler 100, a chimney 129 that discharges an exhaust gas from the exhaust heat recovery boiler 100 to the air, a flue 128 coupling the exhaust heat recovery boiler 100 to the chimney 129, a steam turbine system 200, and a water supply system 70.

The gas turbine 10 includes a compressor 11 that compresses air A, a combustor 20 that generates a combustion gas by burning a fuel in the air A compressed by the compressor 11, and a turbine 30 that is driven by a high-temperature and high-pressure combustion gas.

As shown in FIG. 1, the turbine 30 and the compressor 11 are coaxially disposed, and are connected to each other via a gas turbine rotor 13. The gas turbine rotor 13 is coupled to a rotor of the first generator 15. The gas turbine rotor 13 and the first generator 15 are rotatably supported by first bearings 14.

The steam turbine system 200 of the present embodiment includes a plurality of steam turbines 60, a second generator 230 that generates electric power due to driving of the plurality of steam turbines 60, a condenser 240 that returns steam exhausted from the steam turbines 60 to water, and a saturated steam generation portion 210.

The steam turbine system 200 of the present embodiment includes, as the steam turbines 60, a high-pressure steam turbine 601, an intermediate-pressure steam turbine 602, and a low-pressure steam turbine 603. A configuration of the steam turbines 60 of the present invention will be described in detail by exemplifying the low-pressure steam turbine 603.

The low-pressure steam turbine 603 is provided with a main flow path C through which a main steam flows. The main flow path C is an internal space of the low-pressure steam turbine 603 interposed between a steam inlet and a steam outlet. The main steam is superheated steam when flowing into the main flow path C from the steam inlet. The superheated steam is steam of which a temperature is a saturation temperature (100° C. at the atmospheric pressure) or higher. The main steam is subjected to a pressure reduction toward a downstream side from the steam inlet to the steam outlet, and thus expands. The main steam is brought into a dryness saturation state due to a reduction in the dryness to further expand, and thus becomes wet steam containing fine water droplets (drains). The wet steam is steam of which a temperature is a saturation temperature and the dryness is more than 0% and less than 100%.

The low-pressure steam turbine 603 includes a steam turbine rotor 61 rotating about an axis, a steam turbine casing 64 covering the steam turbine rotor 61, and a plurality of stator vane rows 65 provided on an inner circumferential surface of the steam turbine casing 64. The plurality of stator vane rows 65 are arranged with gaps in an axis direction in which the axis extends. Each stator vane row 65 has a plurality of stator vanes 650 arranged in a circumferential direction centering on the axis. The steam turbine rotor 61 includes a rotor shaft 62 extending in the axis direction centering on the axis, and a plurality of rotor blade lows 63 fixed on an outer circumferential surface of the rotor shaft 62. Each of the plurality of rotor blade lows 63 is disposed on the downstream side of any one of the stator vane rows 65 in the axis direction. Each rotor blade low 63 has a plurality of rotor blades 630 arranged in the circumferential direction centering on the axis. The rotor blades 630 and the stator vanes 650 are disposed in the main flow path C. A single rotor blade low 63 and the stator vane row 65 adjacent thereto on the rotor blade low 63 on the upstream side form a single "stage". The low-pressure steam turbine 603 is provided with a plurality of stages (four stages in the present embodiment) of rotor blade lows 63 and the stator vane rows 65. In the low-pressure steam turbine 603, heights (lengths of the blades orthogonal to the rotor shaft 62) of the rotor blade 630 and the stator vane 650 are formed to increase toward the downstream side from the upstream side in the flow direction of the main flow path C. The high-pressure steam turbine 601 and the intermediate-pressure steam turbine 602 also have the same configuration.

The steam turbine rotors of the high-pressure steam turbine 601, the intermediate-pressure steam turbine 602, and the low-pressure steam turbine 603 are coaxially disposed and are connected to each other, and thus form a single steam turbine rotor. The single steam turbine rotor is coupled to a rotor of the second generator 230. The steam turbine rotor and the rotor of the second generator 230 are rotatably supported by second bearings 220.

In the present embodiment, the single second generator 230 is provided for a total of three steam turbines 60 including the high-pressure steam turbine 601, the intermediate-pressure steam turbine 602, and the low-pressure steam turbine 603. However, in the steam turbine system 200, a generator may be provided for each of the high-pressure steam turbine 601, the intermediate-pressure steam turbine 602, and the low-pressure steam turbine 603.

The condenser 240 of the present embodiment returns steam exhausted from the low-pressure steam turbine 603 to water.

The saturated steam generation portion 210 generates a saturated steam from supplied water. The saturated steam generation portion 210 feeds the saturated steam into a wet region C1 of the main flow path C in which the main steam is in a wet state. The saturated steam generation portion 210 of the present embodiment is supplied with water from the exhaust heat recovery boiler 100. The saturated steam generation portion 210 generates the saturated steam from the supplied water.

Here, the wet state is a state in which the dryness of the main steam flowing through the main flow path C is more than 0% and less than 100%, and indicates that the main steam is wet steam. In the low-pressure steam turbine 603 of the present embodiment, the pressure and the temperature of the flowing main steam are reduced toward the steam outlet from the steam inlet. As a result, in the low-pressure steam turbine 603, the temperature in the main flow path C becomes a saturation temperature in the vicinity of the final stage, and the dryness is also less than 100%. A space of the main flow path C in which the temperature becomes a saturation temperature and the dryness is less than 100% is the wet region C1. The wet region C1 of the present embodiment is, for example, a space in the vicinity of the final stage in the main flow path C of the low-pressure steam turbine 603, and is a space of the main flow path C in which the pressure is lower than the atmospheric pressure and the dryness is less than 100% by several %.

The saturated steam generation portion 210 of the present embodiment generates, as a saturated steam, a low-pressure saturated steam to be fed into the wet region C1 and a high-pressure saturated steam having a pressure higher than that of the low-pressure saturated steam. The saturated steam generation portion 210 feeds the high-pressure saturated steam into an upstream region of the wet region C1 of the main flow path C. The saturated steam generation portion 210 has a flasher that depressurizes water so as to generate a flash steam. In the present embodiment, the saturated steam generation portion 210 has a multi-stage flasher that gradually depressurizes supplied water so as to generate flash steams over a plurality of times instead of a single-stage flasher. The saturated steam generation portion 210 supplies a saturated steam having a pressure corresponding to a pressure of a main steam in the main flow path C of the low-pressure steam turbine 603 at a position into which the main steam is fed. Therefore, the saturated steam generation portion 210 supplies a saturated steam having different pressures and temperatures according to positions into which the saturated steam is fed. The saturated steam generation portion 210 of the present embodiment includes a first flasher 211, a second flasher 212, a third flasher 213, and a fourth flasher 214. Therefore, the saturated steam generation portion 210 of the present embodiment generates flash steam over four-stage times.

The first flasher 211 flashes water supplied from a low-pressure economizer 103 which will be described later, and thus generates a high-pressure saturated steam. The first flasher 211 supplies the low-pressure saturated steam to the upstream side of the wet region C1. Specifically, the first flasher 211 supplies the high-pressure saturated steam to the steam inlet of the low-pressure steam turbine 603. Therefore, the first flasher 211 generates, as the high-pressure saturated steam, a first saturated steam that has a saturation temperature at a pressure equal to that of the main steam supplied to the steam inlet of the low-pressure steam turbine 603. For example, in a case where the main steam at the steam inlet of the low-pressure steam turbine 603 has about 5.2 ata and 280° C., the first saturated steam generated by the first flasher 211 has about 5.2 ata and 150° C. The first flasher 211 supplies first condensed water that is condensed water generated by flashing water from the low-pressure economizer 103, to the second flasher 212.

The second flasher 212 flashes the first condensed water supplied from the first flasher 211. The second flasher 212 generates a second saturated steam as a high-pressure saturated steam having a pressure lower than that of the first saturated steam. The second flasher 212 supplies the second saturated steam to the upstream region of the wet region C1. The second flasher 212 supplies the second saturated steam to a downstream region (for example, the second stage) of the region to which the first saturated steam is supplied from the first flasher 211. Therefore, the second flasher 212 generates the second saturated steam having a saturation temperature at a pressure equal to that of the main steam in the downstream region of the steam inlet of the low-pressure steam turbine 603. For example, in a case where the main steam in the second stage of the low-pressure steam turbine 603 has about 2.7 ata and 220° C., the second saturated steam generated by the second flasher 212 has about 2.7 ata and 130° C. The second flasher 212 supplies second condensed water that is condensed water generated by flashing the first condensed water, to the third flasher 213.

The third flasher 213 flashes the second condensed water supplied from the second flasher 212. The third flasher 213 generates a third saturated steam as a high-pressure saturated steam having a pressure lower than that of the second saturated steam. The third flasher 213 supplies the third saturated steam to the upstream region of the wet region C1. The third flasher 213 supplies the third saturated steam to a downstream region (for example, the third stage) of the region to which the second saturated steam is supplied from the second flasher 212 in the main flow path C. Therefore, the third flasher 213 generates a third saturated steam having a saturation temperature at a pressure equal to that of the main steam in the downstream region of the region to which the second saturated steam is supplied in the main flow path C. For example, in a case where the main steam in the third stage of the low-pressure steam turbine 603 has about 1.1 ata and 140° C., the third saturated steam generated by the third flasher 213 has about 1.1 ata and 100° C. The third flasher 213 supplies third condensed water that is condensed water by flashing the second condensed water, to the fourth flasher 214.

The fourth flasher 214 flashes the third condensed water supplied from the third flasher 213. The fourth flasher 214 generates a fourth saturated steam as a low-pressure saturated steam having a pressure lower than that of the third saturated steam. The fourth flasher 214 supplies the fourth saturated steam to the wet region C1. The fourth flasher 214 supplies the fourth saturated steam to a downstream region (the final stage in the present embodiment) of the region to which the third saturated steam is supplied from the third flasher 213 in the main flow path C. Therefore, the fourth flasher 214 generates the fourth saturated steam having a saturation temperature at a pressure equal to that of the main steam in the wet region C1. For example, in a case where the main steam in the wet region C1 in the vicinity of the final stage of the low-pressure steam turbine 603 has about 0.4 ata and 75° C., the fourth saturated steam generated by the fourth flasher 214 has about 0.4 ata and 75° C. The fourth flasher 214 feeds fourth condensed water to the low-pressure economizer 103 along with water supplied to the low-pressure economizer 103 from a low-temperature heat exchanger 102 which will be described later. The fourth condensed water is condensed water generated by flashing the third condensed water.

The water supply system 70 feeds water in the condenser (supply water source) 240 to the exhaust heat recovery boiler 100 as supply water. The water supply system 70 supplies water having a temperature lower than a dew point temperature of an exhaust gas exhausted from the exhaust heat recovery boiler 100. The water supply system 70 includes a supplied water line 71 coupling the condenser 240 to the exhaust heat recovery boiler 100, and a water supply pump 79 feeding water in the condenser 240 to the exhaust heat recovery boiler 100. The supplied water line 71 couples the condenser 240 to the low-temperature heat exchanger 102 which will be described later. The supplied water line 71 is provided with the water supply pump 79.

The exhaust heat recovery boiler 100 includes a boiler outer frame 101, the low-temperature heat exchanger 102, the low-pressure economizer 103, a low-pressure evaporator 104, a low-pressure superheater 105, an intermediate-pressure reheater 106, a high-pressure economizer 107, a high-pressure evaporator 108, and a high-pressure superheater 109.

The boiler outer frame 101 is coupled to an exhaust port of the turbine 30 and the flue 128. Thus, a combustion gas having rotated the gas turbine rotor 13 flows into the boiler outer frame 101 as an exhaust gas. The exhaust gas passes through the boiler outer frame 101, and is discharged to the air through the flue 128 and the chimney 129. In the present embodiment, it is assumed that the chimney 129 side of the boiler outer frame 101 is a downstream side of a flow of the exhaust gas, and the turbine 30 side opposite thereto is an upstream side.

In the exhaust heat recovery boiler 100 of the present embodiment, the low-pressure economizer 103, the low-pressure evaporator 104, the low-pressure superheater 105, the intermediate-pressure reheater 106, the high-pressure economizer 107, the high-pressure evaporator 108, and the high-pressure superheater 109 are provided inside the boiler outer frame 101. Here, the low-pressure economizer 103, the low-pressure evaporator 104, the low-pressure superheater 105, the high-pressure economizer 107, the high-pressure evaporator 108, the high-pressure superheater 109, and the intermediate-pressure reheater 106 are arranged in this order from the downstream side of the exhaust gas to the upstream side. The low-temperature heat exchanger 102 is disposed in the flue 128. The low-temperature heat exchanger 102 may be disposed outside the boiler outer frame 101 and on the downstream side of the low-pressure economizer 103. The low-temperature heat exchanger 102 may be omitted.

Water supplied from the condenser 240 flows into the low-temperature heat exchanger 102. An exhaust gas having passed through the low-pressure economizer 103 flows into the low-temperature heat exchanger 102. The low-temperature heat exchanger 102 subjects the exhaust gas having passed through the flue 128 and the supplied water to heat exchange, and thus heats the supplied water and cools the exhaust gas. The low-temperature heat exchanger 102 feeds the heated supplied water to the low-pressure economizer 103. The low-temperature heat exchanger 102 and the low-pressure economizer 103 are coupled to a first heated water line 111.

The heated supplied water flows into the low-pressure economizer 103. The exhaust gas having passed through the low-pressure evaporator 104 flows into the low-pressure economizer 103. The low-pressure economizer 103 subjects the exhaust gas and the supplied water heated by the low-temperature heat exchanger 102 to heat exchange, and thus heats the supplied water so as to generate low-pressure heated water. The low-pressure economizer 103 feeds the generated low-pressure heated water to the low-pressure evaporator 104 and the high-pressure economizer 107.

The low-pressure economizer 103 and the low-pressure evaporator 104 are coupled to each other via a second heated water line 112. The second heated water line 112 is provided with a first evaporator supplied water valve 112a. The first evaporator supplied water valve 112a depressurizes the low-pressure heated water. The low-pressure economizer 103 and the high-pressure economizer 107 are coupled to each other via a third heated water line 113. The third heated water line 113 is provided with a high-pressure pump 115. The high-pressure pump 115 pressurizes the low-pressure heated water so as to generate high-pressure heated water. The high-pressure pump 115 feeds the generated high-pressure heated water to the high-pressure economizer 107.

The low-pressure heated water flows into the low-pressure evaporator 104. The exhaust gas having passed through the low-pressure superheater 105 flows into the low-pressure evaporator 104. The low-pressure evaporator 104 subjects the low-pressure heated water heated by the low-pressure economizer 103 and the exhaust gas to heat exchange, and thus heats the low-pressure heated water so as to generate a low-pressure steam. The low-pressure evaporator 104 feeds the generated low-pressure steam to the low-pressure superheater 105. The low-pressure evaporator 104 and the low-pressure superheater 105 are coupled to each other via a first steam line 121.

The low-pressure steam flows into the low-pressure superheater 105. The exhaust gas having passed through the high-pressure economizer 107 flows into the low-pressure superheater 105. The low-pressure superheater 105 subjects the low-pressure steam and the exhaust gas to heat exchange, and thus superheats the low-pressure steam. The low-pressure superheater 105 feeds the superheated low-pressure steam to the low-pressure steam turbine 603 as a low-pressure superheated steam.

The high-pressure heated water flows into the high-pressure economizer 107. The exhaust gas having passed through the high-pressure evaporator 108 flows into the high-pressure economizer 107. The high-pressure economizer 107 subjects the high-pressure heated water and the exhaust gas to heat exchange, and thus further heats the high-pressure heated water. The high-pressure economizer 107 feeds the heated high-pressure heated water to the high-pressure evaporator 108. The high-pressure economizer 107 and the high-pressure evaporator 108 are coupled to each other via a fourth heated water line 114. The fourth heated water line 114 is provided with a second evaporator supplied water valve 114*a*. The second evaporator supplied water valve 114*a* depressurizes the heated high-pressure heated water.

The heated high-pressure heated water flows into the high-pressure evaporator 108. The exhaust gas having passed through the high-pressure superheater 109 flows into the high-pressure evaporator 108. The high-pressure evaporator 108 subjects the high-pressure heated water heated by the high-pressure economizer 107 and the exhaust gas to heat exchange so as to heat the high-pressure heated water, and thus generates a high-pressure steam. The high-pressure evaporator 108 feeds the generated high-pressure steam to the high-pressure superheater 109. The high-pressure evaporator 108 and the high-pressure superheater 109 are coupled to each other via a second steam line 122.

The high-pressure steam flows into the high-pressure superheater 109. The exhaust gas having passed through the intermediate-pressure reheater 106 flows into the high-pressure superheater 109. The high-pressure superheater 109 subjects the high-pressure steam and the exhaust gas to heat exchange, and thus superheats the high-pressure steam. The high-pressure superheater 109 feeds the superheated high-pressure steam to the high-pressure steam turbine 601 as high-pressure superheated steam.

The main steam exhausted from the high-pressure steam turbine 601 flows into the intermediate-pressure reheater 106. The exhaust gas exhausted from the turbine 30 flows into the intermediate-pressure reheater 106. The intermediate-pressure reheater 106 subjects the main steam exhausted from the high-pressure steam turbine 601 and the exhaust gas to heat exchange so as to superheat the main steam, and feeds the superheated main steam to the intermediate-pressure steam turbine 602 as an intermediate-pressure superheated steam.

The high-pressure superheater 109 and the steam inlet of the high-pressure steam turbine 601 are coupled to a high-pressure steam line 131. The steam outlet of the high-pressure steam turbine 601 and the intermediate-pressure reheater 106 are coupled to a high-pressure exhaust air line 132. The intermediate-pressure reheater 106 and the steam inlet of the intermediate-pressure steam turbine 602 are coupled to each other via an intermediate-pressure steam line 133. The steam outlet of the intermediate-pressure steam turbine 602 and the steam inlet of the low-pressure steam turbine 603 are coupled to each other via an intermediate-pressure exhaust air line 134. The intermediate-pressure exhaust air line 134 and the low-pressure superheater 105 via a low-pressure steam line 135. The steam outlet of the low-pressure steam turbine 603 and the condenser 240 are coupled to each other via a low-pressure exhaust air line 136.

The low-pressure economizer 103 and the first flasher 211 are coupled to each other via a first flasher supplied water line 141. The first flasher supplied water line 141 of the present embodiment is coupled to the second heated water line 112, and is indirectly coupled to the low-pressure economizer 103. The first flasher supplied water line 141 is provided with a first flasher supplied water valve 141*a* that controls a state of the supply of water to the first flasher 211.

The first flasher 211 and the low-pressure steam turbine 603 are coupled to each other via a first saturated steam line 151. The first saturated steam line 151 is coupled to the intermediate-pressure exhaust air line 134 on the downstream side of a connection portion between the intermediate-pressure exhaust air line 134 and the low-pressure steam line 135.

The first flasher 211 and the second flasher 212 are coupled to each other via a second flasher supplied water line 142. The second flasher supplied water line 142 is provided with a second flasher supplied water valve 142*a* that controls a state of the supply of water to the second flasher 212.

The second flasher 212 and the low-pressure steam turbine 603 are coupled to each other via a second saturated steam line 152. The second saturated steam line 152 is coupled to communicate with the main flow path C of the low-pressure steam turbine 603 in the vicinity of the second stage. The second saturated steam line 152 of the first embodiment is coupled to communicate with the main flow path C on the upstream side of the rotor blade 630.

The second flasher 212 and the third flasher 213 are coupled to each other via a third flasher supplied water line 143. The third flasher supplied water line 143 is provided with a third flasher supplied water valve 143*a* that controls a state of the supply of water to the third flasher 213.

The third flasher 213 and the low-pressure steam turbine 603 are coupled to each other via a third saturated steam line 153. The third saturated steam line 153 is coupled to communicate with the main flow path C of the low-pressure steam turbine 603 in the vicinity of the third stage. The third saturated steam line 153 of the first embodiment is coupled to communicate with the main flow path C on the upstream side of the rotor blade 630.

The third flasher 213 and the fourth flasher 214 are coupled to each other via a fourth flasher supplied water line 144. The fourth flasher supplied water line 144 is provided with a fourth flasher supplied water valve 144*a* that controls a state of the supply of water to the fourth flasher 214.

The fourth flasher 214 and the low-pressure steam turbine 603 are coupled to each other via a fourth saturated steam line 154. The fourth saturated steam line 154 is coupled to communicate with the main flow path C of the low-pressure steam turbine 603 in the vicinity of the final stage. The fourth saturated steam line 154 of the first embodiment is coupled to communicate with the main flow path C on the upstream side of the rotor blade 630.

The fourth flasher 214 and the low-pressure economizer 103 are coupled to each other via a condensed water exhaust line 155. The condensed water exhaust line 155 is coupled to the first heated water line 111, and is thus indirectly coupled to the low-pressure economizer 103. The condensed water exhaust line 155 is provided with a condensed water exhaust pump 155*a*.

Next, a description will be made of an operation of the combined cycle plant 1 of the present embodiment.

The compressor 11 of the gas turbine 10 compresses the air A, and supplies the compressed air A to the combustor 20. A fuel is also supplied to the combustor 20. In the combustor 20, the fuel is burnt in the compressed air A, and thus a high-temperature and high-pressure combustion gas is generated. The combustion gas is fed to a combustion gas flow path in the turbine 30 from the combustor 20, and rotates the gas turbine rotor 13. The first generator 15 coupled to the gas turbine 10 generates electric power due to the rotation of the gas turbine rotor 13.

The combustion gas having rotated the gas turbine rotor 13 is exhausted as an exhaust gas from the turbine 30, and is discharged to the air from the chimney 129 through the exhaust heat recovery boiler 100 and the flue 128. The exhaust heat recovery boiler 100 recovers heat contained in the exhaust gas when the exhaust gas from the turbine 30 passes therethrough.

In the exhaust heat recovery boiler 100, water is supplied to the low-temperature heat exchanger 102 on the downstream side (the chimney 129 side) via the supplied water line 71. The supplied water is water into which steam exhausted from the steam outlet of the low-pressure steam turbine 603 is converted by the condenser 240. The low-temperature heat exchanger 102 subjects the supplied water and the exhaust gas to heat exchange, and thus heats the supplied water. The supplied water heated by the low-temperature heat exchanger 102 is fed to the low-pressure economizer 103 via the first heated water line 111. The low-pressure economizer 103 subjects the supplied water and the exhaust gas to heat exchange so as to further heat the supplied water, and thus generates low-pressure heated water. The pressure of the low-pressure heated water is maintained to be higher than a drum pressure of the low-pressure evaporator 104 in order to prevent the occurrence of boiling in the low-pressure economizer 103. Part of the low-pressure heated water generated by the low-pressure economizer 103 is depressurized in the first evaporator supplied water valve 112a provided at the second heated water line 112, and is then fed to the low-pressure evaporator 104.

The low-pressure evaporator 104 subjects the low-pressure heated water and the exhaust gas to heat exchange so as to heat the low-pressure heated water, and thus generates a low-pressure steam. The generated low-pressure steam is fed to the low-pressure superheater 105 via the first steam line 121.

The low-pressure superheater 105 subjects the low-pressure steam and the exhaust gas to heat exchange so as to superheat the low-pressure steam, and thus generates a low-pressure superheated steam. The generates low-pressure superheated steam is fed to the steam inlet of the low-pressure steam turbine 603 from the low-pressure steam line 135 via the intermediate-pressure exhaust air line 134.

Part of the low-pressure heated water heated by the low-pressure economizer 103 flows into the third heated water line 113. The low-pressure heated water flowing into the third heated water line 113 is pressurized in the high-pressure pump 115, and thus becomes high-pressure heated water. The high-pressure heated water is fed to the high-pressure economizer 107 via the third heated water line 113.

The high-pressure economizer 107 subjects the high-pressure heated water and the exhaust gas to heat exchange so as to further heat the high-pressure heated water. The high-pressure heated water heated by the high-pressure economizer 107 is fed to the high-pressure evaporator 108 via the fourth heated water line 114. The pressure of the heated high-pressure heated water is maintained to be higher than a drum pressure of the high-pressure evaporator 108 in order to prevent the occurrence of boiling in the high-pressure economizer 107. The high-pressure heated water heated by the high-pressure economizer 107 is depressurized in the second evaporator supplied water valve 114a provided at the fourth heated water line 114, and is then fed to the high-pressure evaporator 108.

The high-pressure evaporator 108 subjects the high-pressure heated water heated by the high-pressure economizer 107 and the exhaust gas to heat exchange so as to heat the high-pressure heated water, and thus generates a high-pressure steam. The generated high-pressure steam is fed to the high-pressure superheater 109 via the second steam line 122.

The high-pressure superheater 109 subjects the high-pressure steam and the exhaust gas to heat exchange so as to superheat the high-pressure steam, and thus generates a high-pressure superheated steam. The generated high-pressure superheated steam is fed to the steam inlet of the high-pressure steam turbine 601 via the high-pressure steam line 131.

Consequently, the high-pressure steam turbine 601 is driven with the high-pressure superheated steam as a main steam. The high-pressure superheated steam is subjected to reductions of both of pressure and temperature during flowing through the high-pressure steam turbine 601. The high-pressure superheated steam exhausted from the high-pressure steam turbine 601 flows into the intermediate-pressure reheater 106 via the high-pressure exhaust air line 132.

The intermediate-pressure reheater 106 reheats the high-pressure superheated steam of which the pressure and temperature are reduced with the exhaust gas. Consequently, intermediate-pressure superheated steam having a pressure lower than the pressure of the high-pressure superheated steam generated by the high-pressure superheater 109 is generated. Here, the temperature of the generated intermediate-pressure superheated steam (reheated steam) is equal to or higher than that of the high-pressure superheated steam. This is because, since the pressure of the intermediate-pressure superheated steam is lower than that of the high-pressure steam, it is easier to increase the temperature of the high-pressure heated steam than to increase the pressure of the intermediate-pressure superheated steam due to a restriction in the durability of facilities such as a pipe or a heat transfer piper. Since the intermediate-pressure reheater 106 is located further toward the upstream side than the high-pressure superheater 109 when viewed from the flow direction of the exhaust gas, and thus the temperature of the intermediate-pressure superheated steam can be made equal to or higher than that of the high-pressure superheated steam.

The intermediate-pressure superheated steam is fed to the steam inlet of the intermediate-pressure steam turbine 602 via the intermediate-pressure steam line 133. Consequently, the intermediate-pressure steam turbine 602 is driven with the intermediate-pressure superheated steam as a main steam. The intermediate-pressure superheated steam is subjected to reductions of both of pressure and temperature during flowing through the intermediate-pressure steam turbine 602, and thus becomes the same extent as the low-pressure superheated steam. The intermediate-pressure superheated steam exhausted from the intermediate-pressure steam turbine 602, that is, an intermediate-pressure exhaust steam is fed to the steam inlet of the low-pressure steam turbine 603 via the intermediate-pressure exhaust air line 134.

Part of the low-pressure heated water heated by the low-pressure economizer 103 flows into the first flasher supplied water line 141 from the second heated water line 112. The low-pressure heated water flowing into the first flasher supplied water line 141 is fed to the first flasher 211 via the first flasher supplied water valve 141a. The first flasher 211 generates a first saturated steam having a pressure equal to that of the low-pressure superheated steam. The first saturated steam flows into the intermediate-pressure exhaust air line 134 via the first saturated steam line 151. Therefore, the intermediate-pressure exhaust steam exhausted from the intermediate-pressure steam turbine 602, the low-pressure superheated steam fed from the low-pressure superheater 105, and the first saturated steam flow into the steam inlet of the low-pressure steam turbine 603. The low-pressure steam turbine 603 is driven with a mixture of the steams as a main steam. The main steam is in a superheated state in the inlet of the low-pressure steam turbine 603.

First condensed water generated due to generation of the first saturated steam flows into the second flasher supplied water line 142 from the first flasher 211. The first condensed water flowing into the second flasher supplied water line 142 is fed to the second flasher 212 via the second flasher supplied water valve 142a. A second saturated steam is generated in the second flasher 212. The second saturated steam is supplied to the second stage of the low-pressure steam turbine 603 via the second saturated steam line 152. In the low-pressure steam turbine 603, the main steam flowing through the vicinity of the second stage of the main flow path C is mixed with the second saturated steam.

Second condensed water generated due to generation of the second saturated steam flows into the third flasher supplied water line 143 from the second flasher 212. The second condensed water flowing into the third flasher supplied water line 143 is fed to the third flasher 213 via the third flasher supplied water valve 143a. A third saturated steam is generated in the third flasher 213. The third saturated steam is supplied to the third stage of the low-pressure steam turbine 603 via the third saturated steam line 153. In the low-pressure steam turbine 603, the main steam flowing through the vicinity of the third stage of the main flow path C is mixed with the third saturated steam.

Third condensed water generated due to generation of the third saturated steam flows into the fourth flasher supplied water line 144 from the third flasher 213. The third condensed water flowing into the fourth flasher supplied water line 144 is fed to the fourth flasher 214 via the fourth flasher supplied water valve 144a. A fourth saturated steam is generated in the fourth flasher 214. The fourth saturated steam is supplied to the wet region C1 in the vicinity of the final stage of the low-pressure steam turbine 603 via the fourth saturated steam line 154. In the low-pressure steam turbine 603, the main steam flowing through the wet region C1 of the main flow path C is mixed with the fourth saturated steam.

Fourth condensed water generated due to generation of the fourth saturated steam flows into the condensed water exhaust line 155 from the fourth flasher 214. The fourth condensed water flowing into the condensed water exhaust line 155 flows into the first heated water line 111 via the condensed water exhaust pump 155a. As a result, the fourth condensed water is fed to the low-pressure economizer 103 along with the supplied water heated by the low-temperature heat exchanger 102.

The main steam exhausted from the steam outlet of the low-pressure steam turbine 603 flows into the condenser 240 via the low-pressure exhaust air line 136. The steam is cooled and condensed in the condenser 240, and thus becomes water. The water is fed to the low-temperature heat exchanger 102 again as supplied water via the supplied water line 71.

According to the combined cycle plant 1 including the steam turbine system 200, the fourth saturated steam is supplied to the wet region C1 of the main flow path C of the low-pressure steam turbine 603 from the fourth flasher 214. The fourth saturated steam is fed into the wet region C1, and thus the fourth saturated steam is mixed with the main steam in the wet region C1. In the wet region C1, the main steam is subjected to a reduction of the dryness to become a wet steam, but is mixed with the fourth saturated steam to be subjected to an increase of the dryness, and thus a heat quantity (entropy) thereof is increased. As a result, it is possible to limit the occurrence of a drain in the wet region C1 or the downstream region of the wet region C1. Consequently, it is possible to prevent the occurrence of erosion in the wet region C1 or the rotor blade 630 disposed in the downstream region of the wet region C1.

In the present embodiment, heat with a temperature in a level corresponding to a saturation temperature at each temperature is effectively recovered and used. To do so, the first saturated steam, the second saturated steam, and the third saturated steam having pressures higher than a pressure of the fourth saturated steam are supplied to the region in which the main steam is in a superheated state and which is an upstream region of the wet region C1. A heat quantity (entropy) of the saturated steam is lower than a heat quantity (entropy) of a superheated steam. Thus, in a case where the saturated steam is supplied to the upstream region of the wet region C1, that is, a superheated region in which the main steam is a superheated steam, the heat quantity (entropy) of the main steam is reduced in each location where steam mixing occurs, and thus the dryness is also reduced in the downstream wet region C1. As a result, this causes erosion or a reduction of efficiency of the steam turbine. However, in the present embodiment, an increase of the dryness in the wet region C1 due to mixing with the fourth saturated steam cancels out a reduction of the dryness in the wet region C1 due to mixing with the first saturated steam, the second saturated steam, and the third saturated steam. As a result, it is possible to limit the occurrence of erosion or a reduction of efficiency of the low-pressure steam turbine.

Each of the first saturated steam, the second saturated steam, the third saturated steam, and the fourth saturated steam has a saturation temperature at a pressure equal to a pressure of the main steam at a feeding position. Therefore, the saturated steam is supplied to the main flow path C of the low-pressure steam turbine 603, and thus it is possible to further limit a reduction of efficiency of the low-pressure steam turbine 603.

The saturated steam generation portion 210 of the present embodiment has the multi-stage flasher that gradually reduces pressures in an order of the first flasher 211, the second flasher 212, the third flasher 213, and the fourth flasher 214, and generates a flash steam over a plurality of times. Thus, it is possible to a plurality of saturated steams having different pressures. As a result, saturated steams having different pressures and temperatures can be fed into the low-pressure steam turbine 603. Therefore, a saturated steam corresponding to a pressure of the main steam flowing through the main flow path C can be supplied to the low-pressure steam turbine 603. The first saturated steam having a relatively high pressure is generated from the low-pressure heated water having a high temperature, and a saturated steam having a pressure lower than that of the first saturated steam is generated from remaining condensed water having a reduced temperature. As mentioned above, saturated steams are sequentially generated while reducing a pressure and a temperature, and thus a saturated steam having as high pressure and temperature as possible can be obtained to be supplied to the steam turbine. As a result, it is possible to effectively increase an output of the steam turbine and the efficiency of the system. Flash steams are generated over a plurality of times while reducing a pressure, and thus supplied water can be used until a temperature of the water becomes low. Thus, heat of the water when a saturated steam is generated can be recovered up to a low temperature, and thus it is possible to improve the efficiency of the system while increasing an output of the steam turbine.

Part of the low-pressure heated water generated by the low-pressure economizer 103 of the exhaust heat recovery boiler 100 is supplied to the first flasher 211 via the first flasher supplied water line 141. Thus, the first saturated steam can be obtained by using the low-pressure heated water that has a high temperature and is heated by using exhaust gas in the exhaust heat recovery boiler 100. The second saturated steam can be obtained by using the first condensed water generated after the first saturated steam is generated. Similarly, the third saturated steam and the fourth saturated steam can be obtained. Since saturated steams can be obtained from the low-pressure heated water having a high temperature over a plurality of stages, saturated steams corresponding to different pressure and temperatures can be easily generated.

The low-pressure heated water generated by the low-pressure economizer 103 in the exhaust heat recovery boiler 100 is supplied to the first flasher 211. Thus, heat of an exhaust gas from the gas turbine 10 can be sufficiently recovered by the exhaust heat recovery boiler 100, and then high-temperature water can be obtained by using the heat of the exhaust gas.

Even in a case where a temperature of an exhaust gas supplied to the low-pressure evaporator 104 is similar to a temperature of the low-pressure heated water supplied to the low-pressure evaporator 104, and thus heat of the exhaust gas cannot be sufficiently recovered in the exhaust heat recovery boiler 100, low-temperature exhaust heat can be recovered. Specifically, the low-pressure superheated water generated by the low-pressure economizer 103 is generated as saturated steams over a plurality of times by the saturated steam generation portion 210, and the saturated steams are supplied to the low-pressure steam turbine 603. Consequently, heat of the exhaust gas is recovered as an output of the low-pressure steam turbine 603. Therefore, it is possible to more effectively use heat contained an exhaust gas.

The fourth condensed water generated due to generation of the fourth saturated steam in the fourth flasher 214 is fed to the first heated water line 111 via the condensed water exhaust line 155. As a result, the fourth condensed water is fed to the low-pressure economizer 103 along with supplied water heated by the low-temperature heat exchanger 102. Therefore, it is possible to prevent that the fourth condensed water is directly returned to the low-temperature heat exchanger 102 that warms the supplied water by using heat of an exhaust gas having the lowest temperature, and thus a temperature of the supplied water is increased. Therefore, it is possible to increase a heat recovery amount in the low-temperature heat exchanger 102 compared with a case where the fourth condensed water is returned to the low-temperature heat exchanger 102. Particularly, as in the present embodiment, in a case where a temperature of supplied water supplied to the low-temperature heat exchanger 102 is lower than a dew point temperature of an exhaust gas, part of moisture in the exhaust gas is condensed by the low-temperature heat exchanger 102, and thus a heat recovery amount in the low-temperature heat exchanger 102 can be further increased.

Second Embodiment

Next, with reference to FIG. 2, a description will be made of a combined cycle plant according to a second embodiment of the present invention. A combined cycle plant 1A of the second embodiment is different from that of the first embodiment in that, for example, a supplied water heater 78 heating supplied water is further provided, or the low-temperature heat exchanger 102 is not provided. Therefore, in a description of the second embodiment, the same portion as that in the first embodiment will be given the same reference numeral, and a description thereof will not be repeated.

Figure 2:
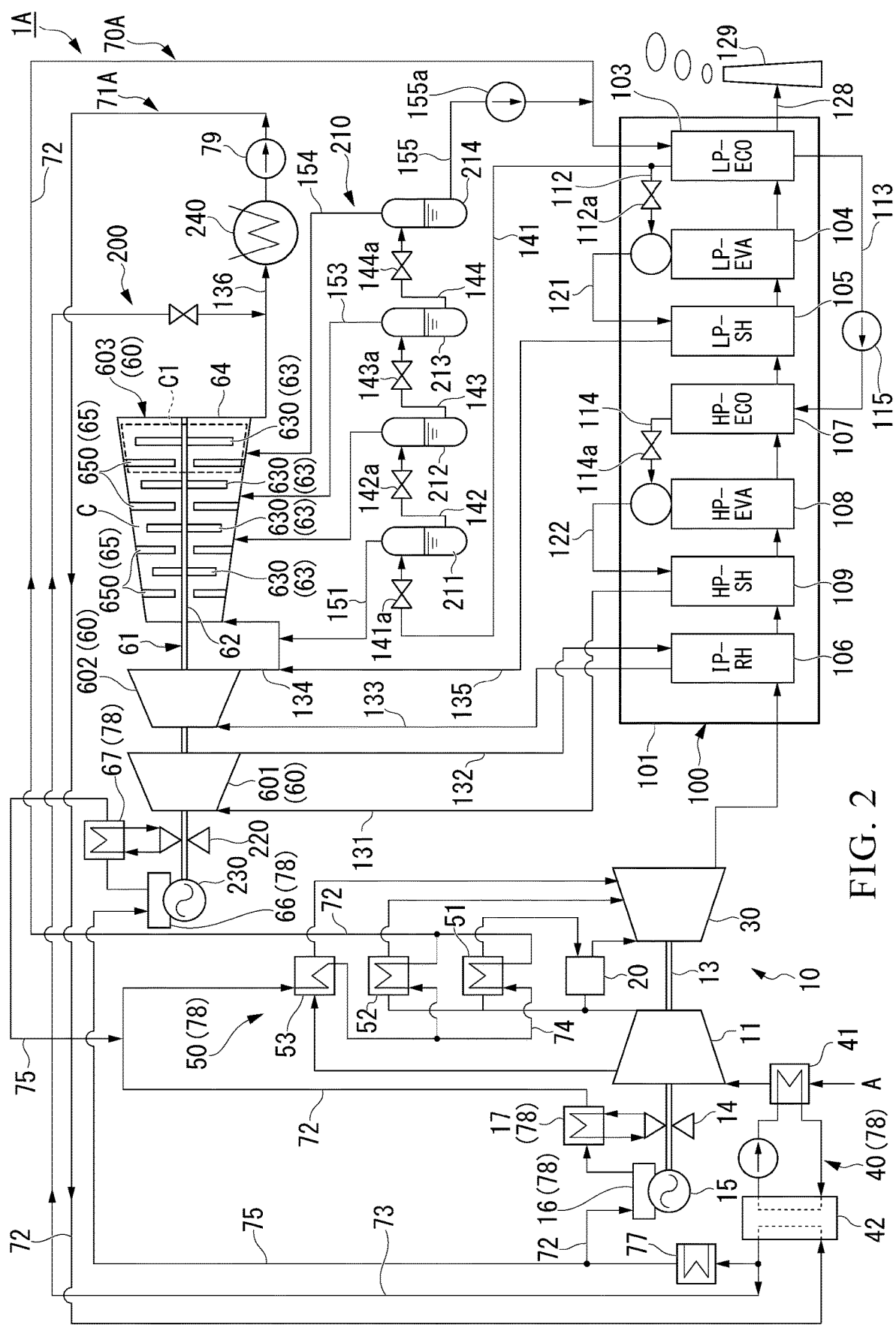
FIG. 2 is a system diagram showing a combined cycle plant in a second embodiment of the present invention.

As shown in FIG. 2, the combined cycle plant 1A of the second embodiment includes an intake air cooler 40, a cooling air cooler (gas turbine cooler) 50, a first generator cooler 16, a first lubricant cooler 17, a second generator cooler 66, and a second lubricant cooler 67.

The intake air cooler 40 subjects a first cooling medium cooling the air A sucked by the compressor 11 and supplied water to heat exchange, and thus cools the first cooling medium and heats the supplied water. The intake air cooler 40 includes an intake air heat exchanger 41 and an intake air refrigerator 42. The intake air heat exchanger 41 subjects the air A sucked by the compressor 11 and the first cooling medium to heat exchange, and thus cools the air A and heats the first cooling medium. The intake air refrigerator 42 moves heat of the first cooling medium heated by the intake air heat exchanger 41 to the supplied water so as to heat the supplied water, and also cools the first cooling medium.

The cooling air cooler 50 subjects a second cooling medium cooling a constituent component of the gas turbine 10 and supplied water to heat exchange, and thus cools the second cooling medium and heats the supplied water. The cooling air cooler 50 cools air in order to a high-temperature component in contact with a high-temperature combustion gas among components forming the gas turbine 10. Therefore, the second cooling medium in the cooling air cooler 50 is air such as compressed air or extracted air. Among the components forming the gas turbine 10, high-temperature components in contact with a high-temperature combustion gas are, for example, a tail pipe of the combustor 20, and a stator vane and a rotor blade of the turbine 30. The cooling air cooler 50 has a first air cooler 51, a second air cooler 52, and a third air cooler 53.

The first air cooler 51 cools compressed air that is compressed by the compressor 11, and thus generates combustor cooling air for cooling a computation of the combustor 20 such as the tail pipe. The first air cooler 51 feeds the generated combustor cooling air to the combustor 20.

The second air cooler 52 cools the compressed air that is compressed by the compressor 11, and thus generates, for example, front-stage cooling air for cooling a stator vane and a rotor blade in a front stage of the turbine 30. The second air cooler 52 feeds the generated front-stage cooling air to the front stage of the turbine 30.

The third air cooler 53 cools extracted air that is extracted from an intermediate stage of the compressor 11, and thus generates, for example, rear-stage cooling air for cooling a stator vane and a rotor blade in a rear stage of the turbine 30. The third air cooler 53 feeds the generated rear-stage cooling air to the rear stage of the turbine 30.

The first generator cooler 16 subjects a third cooling medium cooling a constituent component of the first generator 15 and supplied water to heat exchange, and thus cools the third cooling medium and heats the supplied water. The first generator cooler 16 cools the rotor or the stator of the first generator 15 with the third cooling medium such as hydrogen. The first generator cooler 16 is provided in the first generator 15. The first generator cooler 16 cools the cooling medium through heat exchange with the supplied water.

The first lubricant cooler 17 subjects a lubricant from the first bearings 14 and supplied water to heat exchange so as to cool the lubricant and to heat the supplied water, and returns the cooled lubricant to the first bearings 14. The first lubricant cooler 17 subjects the lubricant from the first bearings 14 and supplied water to heat exchange so as to cool the lubricant. The first lubricant cooler 17 returns the cooled lubricant to the first bearings 14.

The second generator cooler 66 subjects the third cooling medium cooling a constituent component of the second generator 230 and supplied water to heat exchange, and thus cools the third cooling medium and heats the supplied water. In the same manner as the first generator cooler 16, the second generator cooler 66 cools the rotor or the stator of the second generator 230 with the third cooling medium such as hydrogen. The second generator cooler 66 is provided in the second generator 230. The second generator cooler 66 cools the cooling medium through heat exchange with the supplied water.

The second lubricant cooler 67 subjects a lubricant from the second bearings 220 and supplied water to heat exchange so as to cool the lubricant and to heat the supplied water, and returns the cooled lubricant to the second bearings 220. The second lubricant cooler 67 subjects the lubricant from the second bearings 220 and supplied water to heat exchange so as to cool the lubricant. The second lubricant cooler 67 returns the cooled lubricant to the second bearings 220.

A water supply system 70A of the second embodiment includes a supplied water line 71A, a water supply pump 79, and a supplied water heater 78 heating supplied water flowing through the supplied water line 71A.

The supplied water line 71A of the second embodiment includes a first supplied water line 72, a second supplied water line 73, a third supplied water line 74, and a fourth supplied water line 75.

The first supplied water line 72 couples the condenser 240 to the low-pressure economizer 103 of the exhaust heat recovery boiler 100. The first supplied water line 72 is provided with the water supply pump 79. The first supplied water line 72 is provided with the intake air refrigerator 42, a sub-cooler 77, the first generator cooler 16, the first lubricant cooler 17, the third air cooler 53, and the second air cooler 52 in this order on a downstream side of the water supply pump 79 in a flow of supplied water.

Therefore, in the intake air refrigerator 42, heat of a cooling medium heated through heat exchange with the air A sucked by the compressor 11 moves to supplied water flowing through the first supplied water line 72. As a result, the cooling medium is cooled, and the supplied water is heated. The sub-cooler 77 cools the supplied water heated by the intake air refrigerator 42. The first generator cooler 16 subjects the supplied water cooled by the sub-cooler 77 and the cooling medium cooling the first generator 15 to heat exchange, and thus cools the cooling medium and heats the supplied water. The first lubricant cooler 17 subjects the supplied water heated by the first generator cooler 16 and the lubricant from the first bearings 14 to heat exchange, and thus cools the lubricant and heats the supplied water. The third air cooler 53 subjects the supplied water heated by the first lubricant cooler 17 and the extracted air that is extracted from the intermediate stage of the compressor 11 to heat exchange, and thus cools the extracted air and heats the supplied water. The second air cooler 52 subjects the supplied water heated by the third air cooler 53 and compressed air that is compressed by the compressor 11 to heat exchange, and thus cools the compressed air and heats the supplied water.

The second supplied water line 73 branches from the first supplied water line 72 between the intake air refrigerator 42 and the sub-cooler 77. The second supplied water line 73 is coupled to the low-pressure exhaust air line 136. Therefore, the second supplied water line 73 returns part of the supplied water heated by the intake air refrigerator 42 to the condenser 240 again.

The third supplied water line 74 branches from the first supplied water line 72 between the third air cooler 53 and the second air cooler 52. The third supplied water line 74 is joined to the first supplied water line 72 again on a downstream side of the position where the second air cooler 52 is disposed in the first supplied water line 72 in the flow of supplied water. The third supplied water line 74 is provided with the first air cooler 51. Therefore, the first air cooler 51 subjects supplied water flowing through the third supplied water line 74 and compressed air that is compressed by the compressor 11 to heat exchange, and thus cools the compressed air and heats the supplied water.

The fourth supplied water line 75 branches from the first supplied water line 72 between the sub-cooler 77 and the first generator cooler 16. The fourth supplied water line 75 is joined to the third supplied water line 74 between the first lubricant cooler 17 and the third air cooler 53. The fourth supplied water line 75 is provided with the second generator cooler 66 and the second lubricant cooler 67. Therefore, the second generator cooler 66 subjects supplied water flowing through the fourth supplied water line 75 and a cooling medium cooling the second generator 230 to heat exchange, and thus cools the cooling medium and heats the supplied water. The second lubricant cooler 67 subjects the supplied water heated by the second generator cooler 66 and the lubricant from the second bearings 220 to heat exchange, and thus cools the lubricant and heats the supplied water.

The supplied water heater 78 heats supplied water that is water flowing through the supplied water line 71A. The supplied water heater 78 is provided at the supplied water line 71A. The supplied water heater 78 of the present embodiment is configured with the intake air cooler 40, the first generator cooler 16, the first lubricant cooler 17, second generator cooler 66, the second lubricant cooler 67, and the cooling air cooler 50.

The supplied water heater 78 is not limited to a configuration including all of the intake air cooler 40, the first generator cooler 16, the first lubricant cooler 17, the second generator cooler 66, the second lubricant cooler 67, and the cooling air cooler 50. The supplied water heater 78 may include at least one thereof.

The second saturated steam line 152 of the second embodiment is coupled to communicate with the main flow path C on the downstream side of the rotor blade 630 and on the upstream side of the stator vane 650. In other words, the second saturated steam line 152 is not limited to one of communication with the main flow path C on the upstream side of the rotor blade 630 as in the first embodiment and communication with the main flow path C on the downstream side of the rotor blade 630 as in the second embodiment. The second saturated steam line 152 may be coupled to communicate with the main flow path C on the upstream side of the stator vane 650 in the vicinity of the second stage.

The third saturated steam line 153 of the second embodiment is coupled to communicate with the main flow path C on the downstream side of the rotor blade 630 and on the upstream side of the stator vane 650. In other words, the third saturated steam line 153 is not limited to one of communication with the main flow path C on the upstream side of the rotor blade 630 as in the first embodiment and communication with the main flow path C on the downstream side of the rotor blade 630 as in the second embodiment. The third saturated steam line 153 may be coupled to communicate with the main flow path C on the upstream side of the stator vane 650 in the vicinity of the third stage.

The fourth saturated steam line 154 of the second embodiment is coupled to communicate with the main flow path C on the downstream side of the rotor blade 630 and on the upstream side of the stator vane 650. In other words, the fourth saturated steam line 154 is not limited to one of communication with the main flow path C on the upstream side of the rotor blade 630 as in the first embodiment and communication with the main flow path C on the downstream side of the rotor blade 630 as in the second embodiment. The fourth saturated steam line 154 may be coupled to communicate with the main flow path C in the wet region C1 on the upstream side of the stator vane 650 of the wet region C1.

Next, a description will be made of an operation of the combined cycle plant 1A of the second embodiment. In the same manner as in the first embodiment, the main steam exhausted from the low-pressure steam turbine 603 flows into the condenser 240. The steam is cooled and condensed in the condenser 240, and thus becomes water. The water generated by the condenser 240 is pumped as supplied water through the supplied water line 71A by the water supply pump 79. The supplied water flowing through the supplied water line 71A is heated by the supplied water heater 78 during flowing through the supplied water line 71A. Specifically, the supplied water is heated by the intake air cooler 40, the first generator cooler 16, the first lubricant cooler 17, the second generator cooler 66, the second lubricant cooler 67, the first air cooler 51, the second air cooler 52, and the third air cooler 53.

First, the supplied water from the condenser 240 flows through the first supplied water line 72 and then flows into the intake air refrigerator 42. In a case where a temperature of the air A sucked by the compressor 11 increases, a mass flow rate of the air A sucked by the compressor 11 is reduced. Therefore, in a case where the temperature of the air A sucked by the compressor 11 increases, a gas turbine output is reduced. Therefore, in the present embodiment, heat of the air A sucked by the compressor 11 is moved to supplied water by the intake air cooler 40, and thus the supplied water is heated, and the air A is cooled.

Part of the supplied water heated by the intake air cooler 40 flows into the second supplied water line 73. The supplied water flowing into the second supplied water line 73 is fed to the condenser 240 again via the low-pressure exhaust air line 136.

Part of the supplied water heated by the intake air cooler 40 further flows through the first supplied water line 72, and is then fed to the sub-cooler 77. The supplied water fed to the sub-cooler 77 is cooled, and is fed to the first generator cooler 16. The supplied water fed to the first generator cooler 16 moves the heat of the third cooling medium to the supplied water, and thus heats the supplied water and cools the third cooling medium.

The supplied water heated by the first generator cooler 16 is fed to the first lubricant cooler 17. The supplied water fed to the first lubricant cooler 17 moves heat of a lubricant to the supplied water, and thus heats the supplied water and cools the lubricant.

Part of the supplied water heated by the first lubricant cooler 17 further flows through the first supplied water line 72, and is then fed to the third air cooler 53. The supplied water fed to the third air cooler 53 moves heat of extracted air to the supplied water, and thus heats the supplied water and cools the extracted air.

The supplied water heated by the third air cooler 53 is fed to the second air cooler 52. The supplied water fed to the second air cooler 52 moves heat of compressed air to the supplied water, and thus heats the supplied water and cools the compressed air. The supplied water heated by the second air cooler 52 further flows through the first supplied water line 72 to be joined to the fourth condensed water, and is then fed to the low-pressure economizer 103.

Part of the supplied water cooled by the sub-cooler 77 flows into the fourth supplied water line 75. The supplied water flowing into the fourth supplied water line 75 is fed to the second generator cooler 66. The supplied water fed to the second generator cooler 66 moves heat of the third cooling medium to the supplied water, and thus heats the supplied water and cools the third cooling medium.

The supplied water heated by the second generator cooler 66 is fed to the second lubricant cooler 67. The supplied water fed to the second lubricant cooler 67 moves heat of a lubricant to the supplied water, and thus heats the supplied water and cools the lubricant. As mentioned above, the supplied water heated by the second generator cooler 66 and the second lubricant cooler 67 is joined to the first supplied water line 72 again, to be joined to the supplied water heated by the first lubricant cooler 17, and is then fed to the third air cooler 53.

Part of the supplied water heated by the third air cooler 53 is fed to the first air cooler 51 via the third supplied water line 74. The supplied water fed to the first air cooler 51 moves heat of compressed air to the supplied water, and thus heats the supplied water and cools the compressed air. As mentioned above, the supplied water heated by the first air cooler 51 is joined to the first supplied water line 72 again, to be joined to the supplied water heated by the second air cooler 52, and is then fed to the low-pressure economizer 103 along with the fourth condensed water.

According to the combined cycle plant 1A including the steam turbine system 200, as heat sources heating supplied water in the supplied water heater 78, heat obtained by cooling the air A sucked by the compressor 11, heat obtained by cooling compressed air and extracted air cooling a constituent component of the gas turbine 10, heat obtained by cooling a lubricant, and heat obtained by cooling the generators may be effectively used. Thus, in the second embodiment, it is possible to effectively use heat exhausted by cooling such cooling targets and thus to improve the efficiency of the combined cycle plant 1A.

In the second embodiment, the fourth condensed water is joined to the supplied water subjected to a temperature increase by cooling all of the cooling targets. Therefore, a temperature of supplied water used for cooling can be maintained at a low temperature compared with a case where supplied water joined with the fourth condensed water is first fed to the intake air cooler 40, the cooling air cooler 50, the first generator cooler 16, the first lubricant cooler 17, the second generator cooler 66, and the second lubricant cooler 67. Thus, it is possible to increase a heat exchange amount in each cooler. Consequently, it is possible to improve reliability by limiting a reduction in cooling efficiency in each piece of equipment, and also to increase an output of the steam turbine and the efficiency of the system by increasing an exhaust heat recovery amount during cooling.

Third Embodiment

Next, with reference to FIG. 3, a description will be made of a combined cycle plant according to a third embodiment of the present invention. A combined cycle plant 1B of the third embodiment is different from that of the first embodiment and the second embodiment in terms of a position to which a saturated steam is supplied in the wet region C1. Therefore, in a description of the third embodiment, the same portion as that in the first embodiment and the second embodiment will be given the same reference numeral, and a description thereof will not be repeated.

Figure 3:
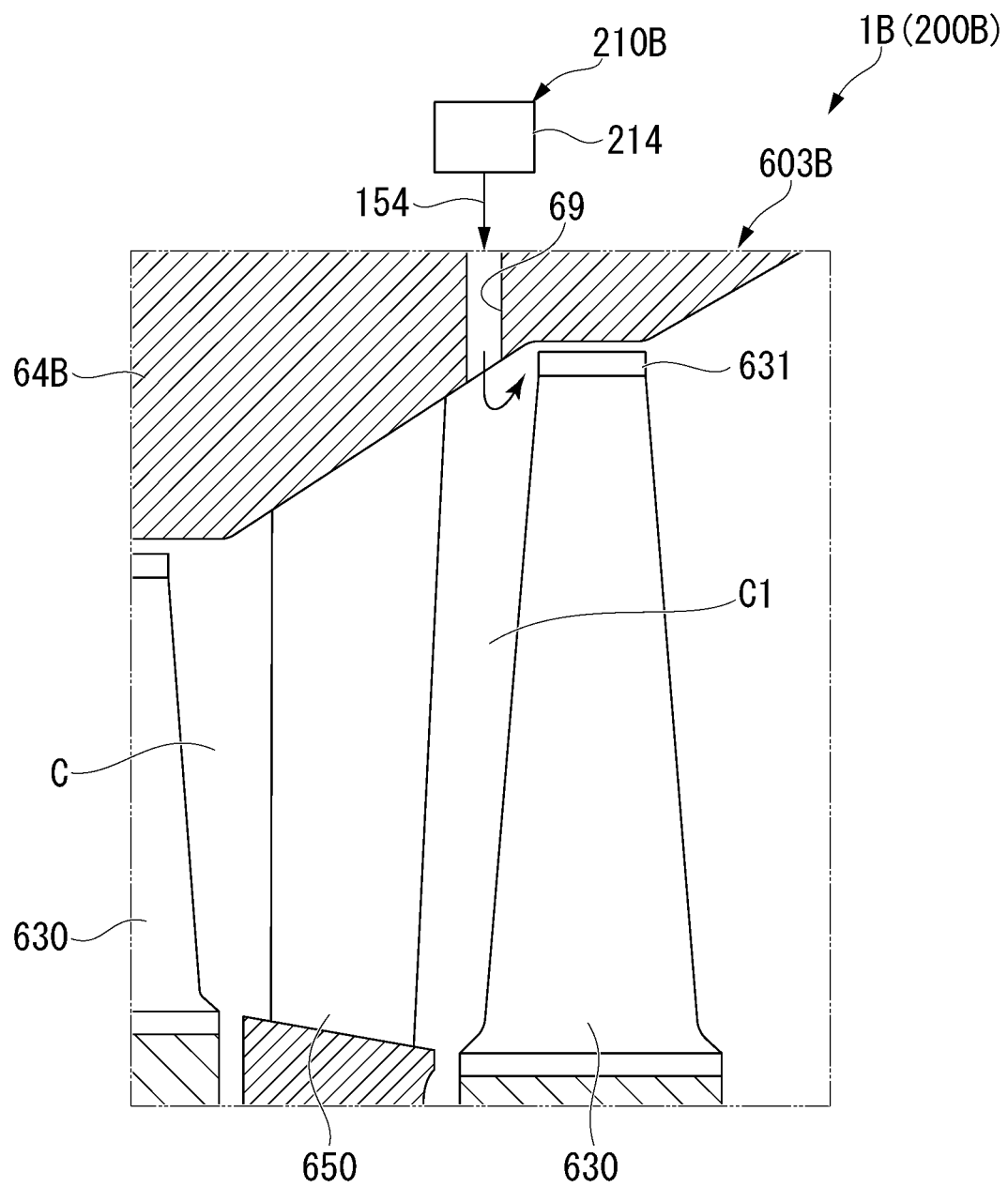
FIG. 3 is a main portion sectional view showing the periphery of a wet region of a steam turbine in a third embodiment of the present invention.

As shown in FIG. 3, in a steam turbine system 200B of the combined cycle plant 1B according to the third embodiment, a saturated steam generation portion 210B supplies the fourth saturated steam between the stator vane 650 and the rotor blade 630 in the wet region C1. Specifically, a low-pressure steam turbine 603B of the third embodiment has a saturated steam introducing portion 69. The saturated steam introducing portion 69 causes the fourth saturated steam line 154 to communicate with the main flow path C. The saturated steam introducing portion 69 is provided to penetrate through a steam turbine casing 64B. The saturated steam introducing portion 69 is open around a tip end 631 side of the rotor blade 630 between the rotor blade 630 and the stator vane 650 in the final stage. Consequently, the saturated steam generation portion 210B of the third embodiment supplies the fourth saturated steam generated by the fourth flasher 214 into the main flow path C from the upstream side of the rotor blade 630 of a low-pressure steam turbine 603B in the final stage toward the tip end 631 of the rotor blade 630.

According to the combined cycle plant 1B including the steam turbine system 200B, the fourth saturated steam generated by the fourth flasher 214 flows into the saturated steam introducing portion 69 via the fourth saturated steam line 154. The fourth saturated steam flowing into the saturated steam introducing portion 69 is supplied to the wet region C1 from an opening of the steam turbine casing 64B in contact with the main flow path C. In the wet region C1, the fourth saturated steam is supplied to the vicinity of the tip end 631 of the rotor blade 630 from the downstream side of the previous stator vane 650 disposed on the downstream side of the rotor blade 630 in the final stage. Consequently, in the wet region C1, the fourth saturated steam is intensively supplied to, especially, the rotor blade 630 that is easily influenced by erosion. The saturated steam introducing portion 69 is open around the tip end 631 side of the rotor blade 630 in the steam turbine casing 64B. Consequently, a large amount of the fourth saturated steam is supplied to the vicinity of, especially, the tip end 631 easily influenced by the erosion in the rotor blade 630. Therefore, in the rotor blade 630, it is possible to limit the occurrence of a drain at, especially, the tip end 631 in which erosion easily occurs.

Fourth Embodiment

Next, with reference to FIGS. 4 and 5, a description will be made of a combined cycle plant according to a fourth embodiment of the present invention. A combined cycle plant 1C of the fourth embodiment is different from that of the first to third embodiments in terms of a position to which a saturated steam is supplied in the wet region C1. Therefore, in a description of the fourth embodiment, the same portion as that in the first embodiment to the third embodiment will be given the same reference numeral, and a description thereof will not be repeated.

Figure 4:
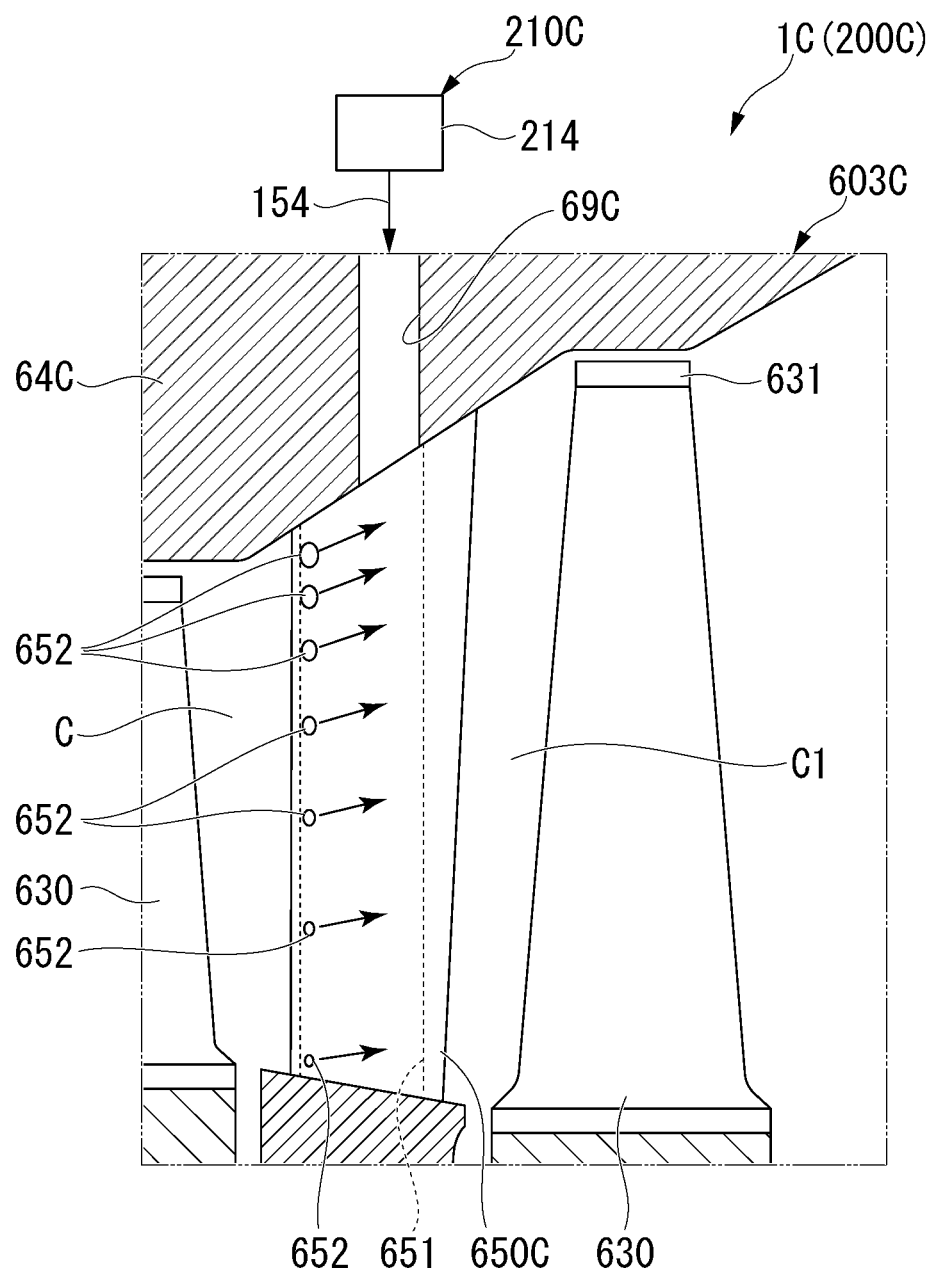
FIG. 4 is a main portion sectional view showing the periphery of a wet region of a steam turbine in a fourth embodiment of the present invention.
Figure 5:
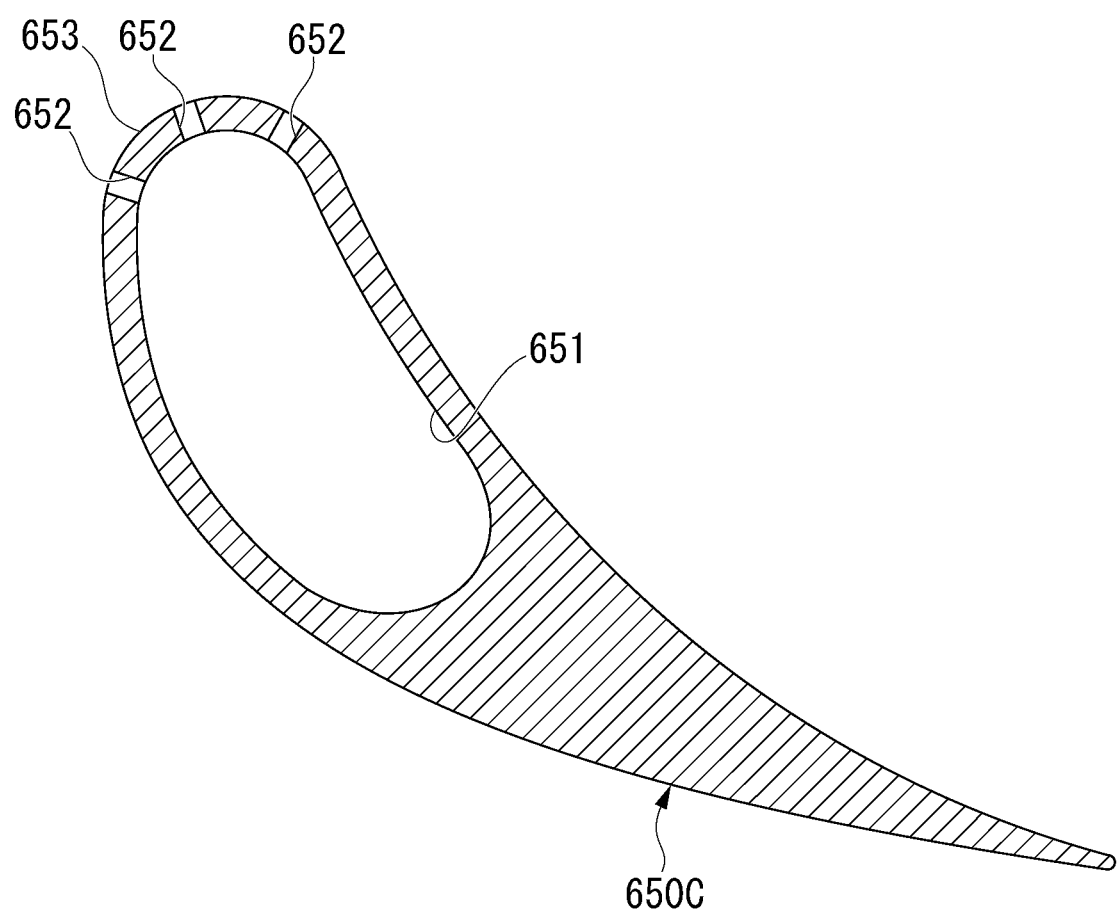
FIG. 5 is a sectional view showing a stator vane in the fourth embodiment of the present invention.

As shown in FIG. 4, in the combined cycle plant 1C of the fourth embodiment, a saturated steam generation portion 210C supplies the fourth saturated steam to a hollow portion 651. The hollow portion 651 is formed inside a stator vane 650C disposed in the wet region C1 of a low-pressure steam turbine 603C. Specifically, the low-pressure steam turbine 603C of the fourth embodiment has a saturated steam introducing portion 69C. The saturated steam introducing portion 69C causes the fourth saturated steam line 154 to communicate with the hollow portion 651. The saturated steam introducing portion 69C is provided to penetrate through a steam turbine casing 64.

The stator vane 650C of the fourth embodiment has the hollow portion 651 and a plurality of supply ports 652. As shown in FIG. 5, the hollow portion 651 is a through-hole formed inside the stator vane 650C. The hollow portion 651 extends from an inner circumferential side (rotor shaft 62 side) to an outer circumferential side (steam turbine casing 64 side) in a blade height direction of the stator vane 650C. The hollow portion 651 is formed at a position close to a front edge portion 653 in a blade section. An opening of the hollow portion 651 on the outer circumferential side is connected to the saturated steam introducing portion 69C. The hollow portion 651 of the present embodiment is formed only inside the stator vane 650C disposed in the final stage corresponding to the wet region C1.

The plurality of supply ports 652 are formed in the front edge portion 653 of the stator vane 650C to cause the hollow portion 651 to communicate with the main flow path C. The supply ports 652 discharge the fourth saturated steam supplied into the hollow portion 651 to the main flow path C. The plurality of (in the present embodiment, three) supply ports 652 are formed in the front edge portion 653 in the blade section. As shown in FIG. 4, the plurality of supply ports 652 are formed to be separated from each other in a plurality of rows (seven rows in the present embodiment) in the blade height direction. The plurality of supply ports 652 are formed such that a discharge amount of the fourth saturated steam increases from the inner circumferential side toward the outer circumferential side in the blade height direction. Specifically, the plurality of supply ports 652 may have increasing hole diameters from the inner circumferential side toward the outer circumferential side in the blade height direction. The plurality of supply ports 652 may be disposed such that gaps in the blade height direction are reduced from the inner circumferential side toward the outer circumferential side in the blade height direction.

According to the combined cycle plant 1C including the steam turbine system 200C, the fourth saturated steam generated by the fourth flasher 214 flows into the saturated steam introducing portion 69C via the fourth saturated steam line 154. The fourth saturated steam flowing into the saturated steam introducing portion 69C flows into the hollow portion 651. The fourth saturated steam flowing into the hollow portion 651 are discharged to the wet region C1 from the plurality of supply ports 652 while flowing in the hollow portion 651 from the outer circumferential side to the inner circumferential side. The fourth saturated steam discharged from the supply ports 652 is discharged from the front edge portion 653 of the stator vane 650C toward the upstream side, and then flows toward the downstream side. The amount of the fourth saturated steam discharged from the supply ports 652 increases from the inner circumferential side toward the outer circumferential side in the blade height direction. Thus, an amount of the fourth saturated steam flowing in the wet region C1 is more on the outer circumferential side than on the inner circumferential side in the blade height direction. As a result, in the wet region C1, the fourth saturated steam is intensively supplied to, especially, the tip end 631 of the rotor blade 630 that is easily influenced by erosion. Therefore, in the rotor blade 630, it is possible to limit the occurrence of a drain at, especially, the tip end 631 in which erosion easily occurs.

Fifth Embodiment

Next, with reference to FIG. 6, a description will be made of a combined cycle plant according to a fifth embodiment of the present invention. A combined cycle plant 1D of the fifth embodiment is different from that of the first embodiment to the fourth embodiment in terms of a configuration of a saturated steam generation portion 210D. Therefore, in a description of the fifth embodiment, the same portion as that in the first embodiment to the fourth embodiment will be given the same reference numeral, and a description thereof will not be repeated.

Figure 6:
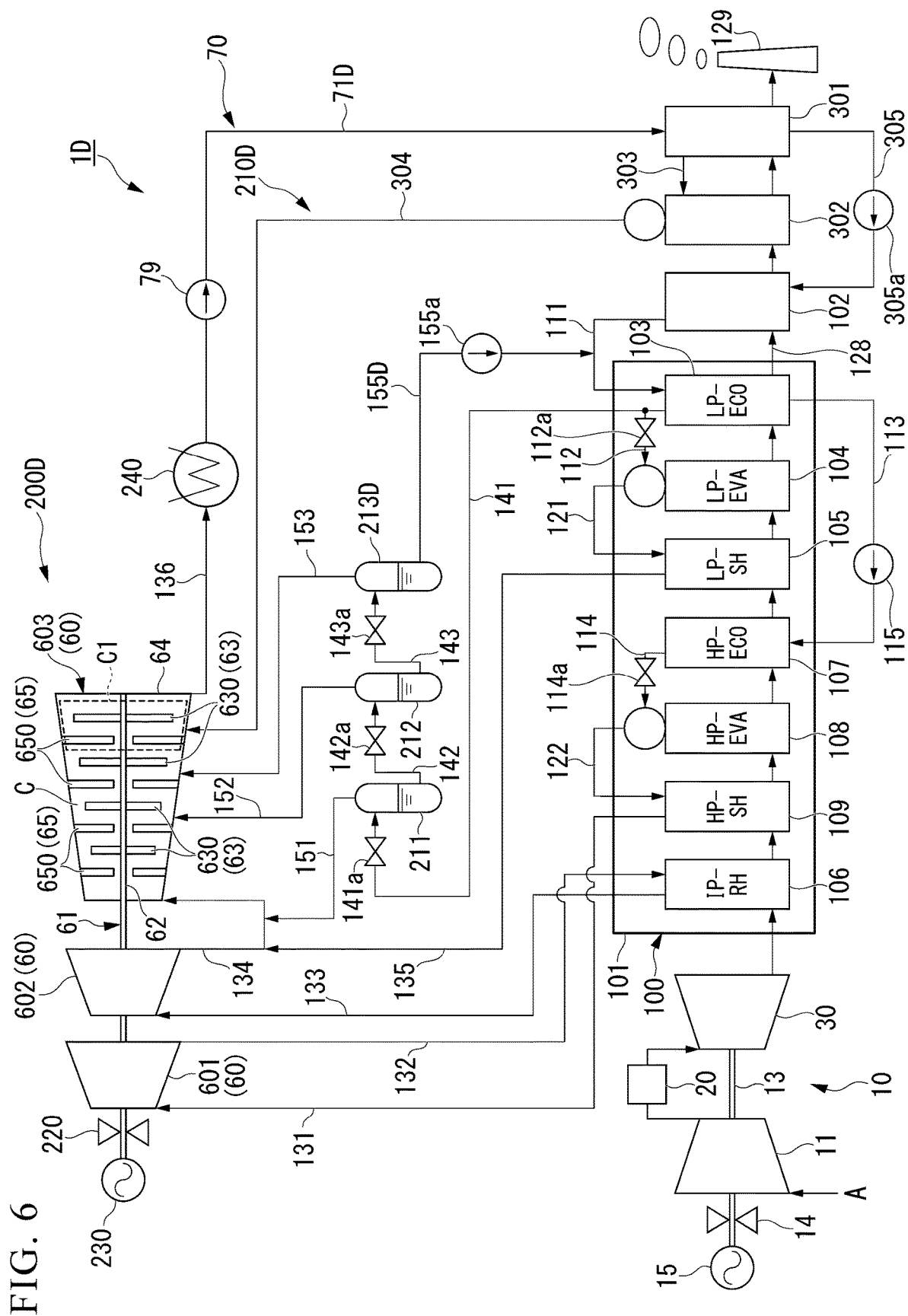
FIG. 6 is a system diagram showing a combined cycle plant in a fifth embodiment of the present invention.

As shown in FIG. 6, in a steam turbine system 200D of the combined cycle plant 1D according to the fifth embodiment, another device is used as a supply source of a saturated steam supplied to the wet region C1 instead of the multi-stage flasher. The combined cycle plant 1D further includes a low-temperature and low-pressure economizer 301 and a low-temperature and low-pressure evaporator 302.

The low-temperature and low-pressure economizer 301 is disposed between the low-temperature heat exchanger 102 and the chimney 129. A supplied water line 71D is coupled to the low-temperature and low-pressure economizer 301, and thus supplied water from the condenser 240 flows thereinto.

An exhaust gas flows into the low-temperature and low-pressure economizer 301 via the low-temperature and low-pressure evaporator 302. The low-temperature and low-pressure economizer 301 subjects an exhaust gas having passed through the flue 128 and supplied water to heat exchange, and thus heats the supplied water so as to generate low-temperature and low-pressure heated water. The low-temperature and low-pressure heated water has a temperature and a pressure lower than those of low-pressure heated water generated by the low-pressure economizer 103. The low-temperature and low-pressure economizer 301 feeds the generated low-temperature and low-pressure superheated water to the low-temperature and low-pressure evaporator 302 or the low-temperature heat exchanger 102. The low-temperature and low-pressure economizer 301 and the low-temperature and low-pressure evaporator 302 are coupled to each other via a low-temperature and low-pressure heated water line 303. The low-temperature and low-pressure economizer 301 and the low-temperature heat exchanger 102 are coupled to each other via a supplied water branch line 305. The supplied water branch line 305 is provided with a branch line pump 305a for pressurizing. An exhaust gas passing through the low-temperature and low-pressure economizer 301 is discharged to the air from the chimney 129.

Part of the low-temperature and low-pressure heated water flows into the low-temperature and low-pressure evaporator 302. An exhaust flows into the low-temperature and low-pressure evaporator 302 via the low-temperature heat exchanger 102. The low-temperature and low-pressure evaporator 302 subjects the low-temperature and low-pressure heated water and the exhaust gas to heat exchange. The low-temperature and low-pressure evaporator 302 heats the low-temperature and low-pressure heated water so as to generate a low-temperature and low-pressure saturated steam. The low-temperature and low-pressure saturated steam is a low-pressure saturated steam having a saturation temperature at a pressure equal to that of the main steam in the wet region C1 in the same manner as the fourth saturated steam. The low-temperature and low-pressure evaporator 302 feeds the generated low-temperature and low-pressure saturated steam to the wet region C1 of the low-pressure steam turbine 603.

The low-temperature and low-pressure evaporator 302 and the low-pressure steam turbine 603 are coupled to each other via a low-temperature and low-pressure saturated steam line 304. The low-temperature and low-pressure saturated steam line 304 is coupled to communicate with the main flow path C of the low-pressure steam turbine 603 in the vicinity of the final stage.

Part of the low-temperature and low-pressure heated water is pressurized in the branch line pump 305a and then flows into the low-temperature heat exchanger 102. The low-temperature heat exchanger 102 subjects the exhaust gas having passed through the flue 128 and the pressurized low-temperature and low-pressure heated water to heat exchange, and thus heats the low-temperature and low-pressure heated water and cools the exhaust gas.

The saturated steam generation portion 210D of the fifth embodiment is configured with the first flasher 211, the second flasher 212, a third flasher 213D, and the low-temperature and low-pressure evaporator 302. Therefore, the multi-stage flasher used in the fifth embodiment has three stages, and does not have the fourth flasher 214.

The third flasher 213D of the fifth embodiment supplies the third condensed water that is condensed water generated by flashing water, to the low-pressure economizer 103. Therefore, a condensed water exhaust line 155D of the fifth embodiment couples the third flasher 213D to the low-pressure economizer 103. The condensed water exhaust line 155D is coupled to the first heated water line 111. The condensed water exhaust line 155D is provided with the condensed water exhaust pump 155a.

The combined cycle plant 1D including the steam turbine system 200D can also increase the dryness of steam in the wet region C1. As a result, it is possible to limit the occurrence of a drain in the wet region C1 or a downstream side of the wet region C1. Consequently, it is possible to limit the occurrence of erosion in the wet region C1 or the rotor blade 630 disposed on the downstream side of the wet region C1.

Sixth Embodiment

Next, with reference to FIG. 7, a description will be made of a combined cycle plant according to a sixth embodiment of the present invention. A combined cycle plant 1E of the sixth embodiment is different from that of the first embodiment to the fifth embodiment in terms of a configuration of a saturated steam generation portion 210E. Therefore, in a description of the sixth embodiment, the same portion as that in the first embodiment to the fifth embodiment will be given the same reference numeral, and a description thereof will not be repeated.

Figure 7:
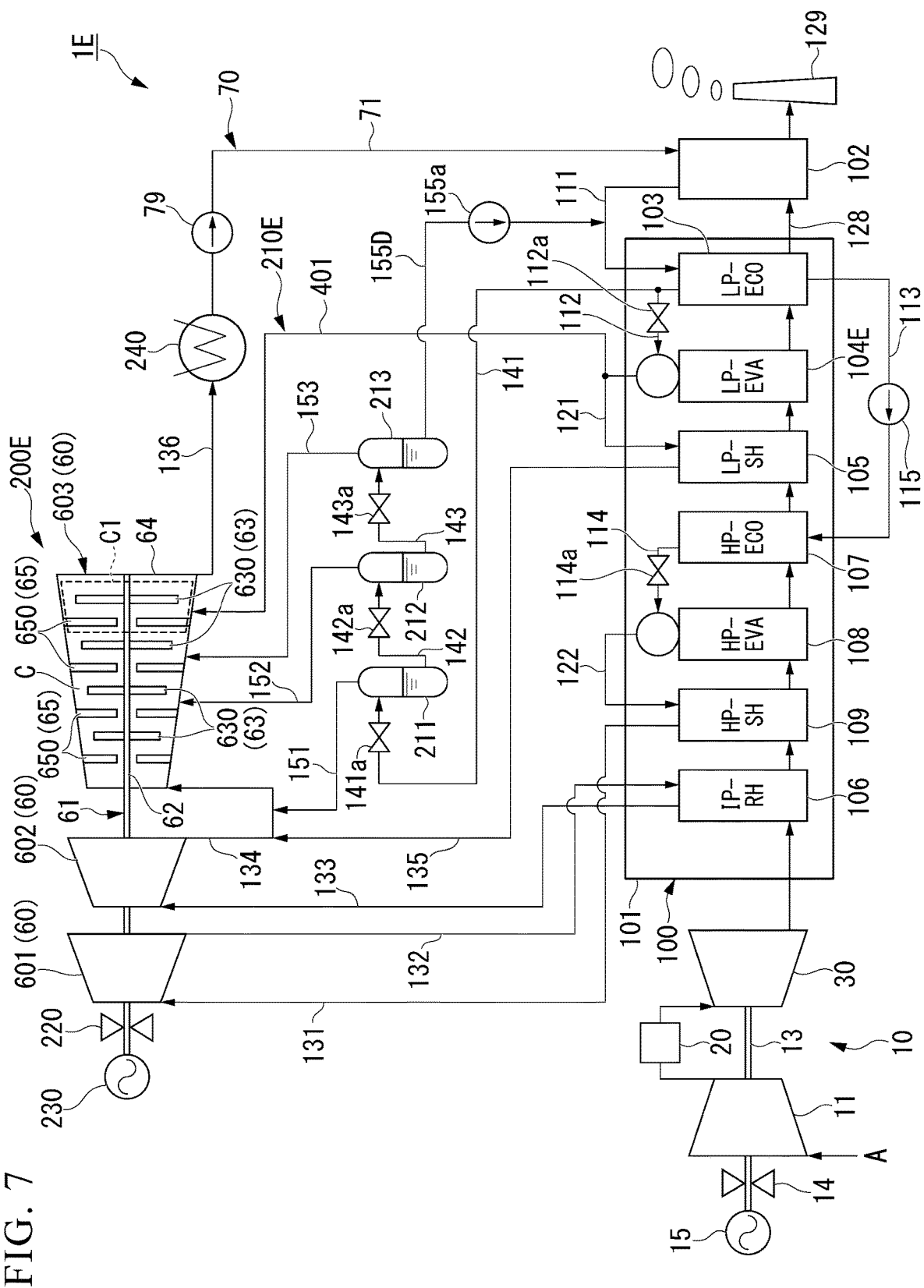
FIG. 7 is a system diagram showing a combined cycle plant in a sixth embodiment of the present invention.

As shown in FIG. 7, in a steam turbine system 200E of the combined cycle plant 1E according to the sixth embodiment, another device is used as a supply source of a saturated steam supplied to the wet region C1 instead of the multi-stage flasher in the same manner as in the fifth embodiment. A low-pressure steam is supplied from a low-pressure evaporator 104E to the wet region C1 as a saturated steam. Therefore, the saturated steam generation portion 210E of the sixth embodiment is configured with the first flasher 211, the second flasher 212, the third flasher 213, and the low-pressure evaporator 104E. Therefore, the saturated steam generation portion 210E of the sixth embodiment does not have the fourth flasher 214 in the same manner as in the third embodiment.

The low-pressure evaporator 104E of the sixth embodiment feeds part of the generated low-pressure steam to the wet region C1 of the low-pressure steam turbine 603 as a low-pressure saturated steam. The low-pressure evaporator 104E and the low-pressure steam turbine 603 are coupled to each other via a low-pressure saturated steam line 401. The low-pressure saturated steam line 401 is coupled to the first steam line 121. The low-temperature and low-pressure saturated steam line 304 is coupled to communicate with the main flow path C of the low-pressure steam turbine 603 in the vicinity of the final stage.

The combined cycle plant 1E including the steam turbine system 200E can also increase the dryness of steam in the wet region C1. As a result, it is possible to limit the occurrence of a drain in the wet region C1 or a downstream side of the wet region C1. Consequently, it is possible to limit the occurrence of erosion in the wet region C1 or the rotor blade 630 disposed on the downstream side of the wet region C1.

Unlike in the fifth embodiment, the low-temperature and low-pressure economizer 301 and the low-temperature and low-pressure evaporator 302 are not necessary, and thus a saturated steam can be supplied to the wet region C1 with simpler facilities than in the fifth embodiment.

Seventh Embodiment

Next, with reference to FIG. 8, a description will be made of a combined cycle plant according to a seventh embodiment of the present invention. A combined cycle plant 1F of the seventh embodiment is different from that of the first embodiment to the sixth embodiment in terms of a configuration of a saturated steam generation portion 210F. Therefore, in a description of the seventh embodiment, the same portion as that in the first embodiment to the sixth embodiment will be given the same reference numeral, and a description thereof will not be repeated.

Figure 8:
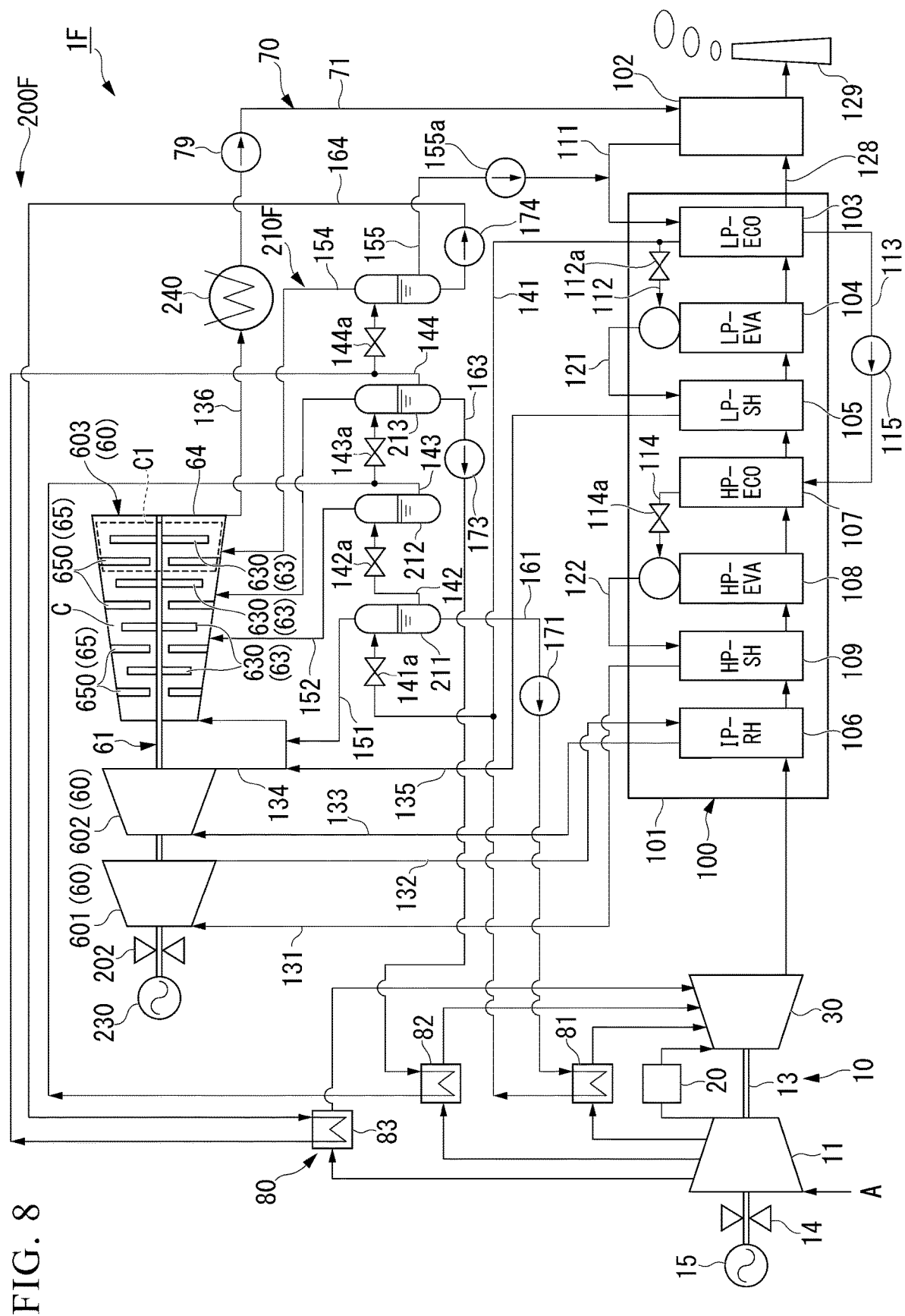
FIG. 8 is a system diagram showing a combined cycle plant in a seventh embodiment of the present invention.

As shown in FIG. 8, in a steam turbine system 200F of the combined cycle plant 1F according to the seventh embodiment, a multi-stage flasher of the saturated steam generation portion 210F has a configuration for further recovering heat exhausted from the gas turbine 10. Specifically, the saturated steam generation portion 210F of the seventh embodiment recovers heat exhausted from an extracted air cooler 80 cooling extracted air that is extracted from the intermediate stage of the compressor 11.

The combined cycle plant 1F of the seventh embodiment includes the extracted air cooler 80 that cools extracted air that is extracted from the compressor 11, and then feeds the cooled air to the turbine 30 such that a constituent component of the turbine 30 is cooled. The extracted air cooler 80 includes a first extracted air cooler 81, a second extracted air cooler 82, and a third extracted air cooler 83.

The first extracted air cooler 81 cools extracted air that is extracted from the rear stage of the compressor 11 so as to generate, for example, front-stage cooling air for cooling the stator vane and the rotor blade in the front stage of the turbine 30. The first extracted air cooler 81 feeds the generated front-stage cooling air to the front stage of the turbine 30.

The second extracted air cooler 82 extracts air from the compressor 11 on an upstream side of the first extracted air cooler 81. The second extracted air cooler 82 feeds cooled extracted air to the turbine 30 on a downstream side of the first extracted air cooler 81. Therefore, the second extracted air cooler 82 cools extracted air that is extracted from the intermediate stage of the compressor 11, and thus generates, for example, intermediate-stage cooling air for cooling the stator vane and the rotor blade in the intermediate stage of the turbine 30. The second extracted air cooler 82 feeds the generated intermediate-stage cooling air to the intermediate stage of the turbine 30.

The third extracted air cooler 83 extracts air from the compressor 11 on an upstream side of the second extracted air cooler 82. The third extracted air cooler 83 feeds cooled extracted air to the turbine 30 on a downstream side of the second extracted air cooler 82. Therefore, the third extracted air cooler 83 cools extracted air that is extracted from, for example, the front stage of the compressor 11, and generates rear-stage cooling air for cooling the stator vane and the rotor blade in the rear stage of the turbine 30. The third extracted air cooler 83 feeds the generated rear-stage cooling air to the rear stage of the turbine 30.

The first flasher 211 of the seventh embodiment feeds part of the first condensed water to the second flasher supplied water line 142 and a first condensed water return line 161. The first condensed water return line 161 heats the first condensed water and then feeds the first condensed water to the first flasher supplied water line 141. The first condensed water return line 161 couples the first flasher 211 to the first flasher supplied water line 141. The first condensed water return line 161 is coupled to the first flasher supplied water line 141 on an upstream side of the first flasher supplied water valve 141a. The first condensed water return line 161 is provided with a first condensed water feed pump 171. The first condensed water feed pump 171 is a pressurizer configured to pressurize the first condensed water generated by the first flasher 211. The first condensed water return line 161 is provided with the first extracted air cooler 81 on a downstream side of the first condensed water feed pump 171. The first extracted air cooler 81 subjects the first condensed water pumped through the first condensed water return line 161 by the first condensed water feed pump 171 and the extracted air that is extracted from the rear stage of the compressor 11 to heat exchange. As a result, the extracted air is cooled, and the first condensed water is also heated. Therefore, the first extracted air cooler 81 also functions as a heat source heating the first condensed water.

The third flasher 213 of the seventh embodiment feeds part of the third condensed water to the fourth flasher supplied water line 144 and a third condensed water return line 163. The third condensed water return line 163 heats the third condensed water and then feeds the third condensed water to the third flasher supplied water line 143. The third condensed water return line 163 couples the third flasher 213 to the third flasher supplied water line 143. The third condensed water return line 163 is coupled to the third flasher supplied water line 143 on an upstream side of the third flasher supplied water valve 143a. The third condensed water return line 163 is provided with a third condensed water feed pump 173. The third condensed water feed pump 173 is a pressurizer configured to pressurize the third condensed water generated by the third flasher 213. The third condensed water return line 163 is provided with the second extracted air cooler 82 on a downstream side of the third condensed water feed pump 173. Therefore, the second extracted air cooler 82 subjects the third condensed water pumped through the third condensed water return line 163 by the third condensed water feed pump 173 and the extracted air that is extracted from the intermediate stage of the compressor 11 to heat exchange. As a result, the extracted air is cooled, and the third condensed water is also heated. Therefore, the second extracted air cooler 82 also functions as a heat source heating the third condensed water.

The fourth flasher 214 of the seventh embodiment feeds part of the fourth condensed water to the condensed water exhaust line 155 and to a fourth condensed water return line 164. The fourth condensed water return line 164 heats the fourth condensed water and then feeds the fourth condensed water to the fourth flasher supplied water line 144. The fourth condensed water return line 164 couples the fourth flasher 214 to the fourth flasher supplied water line 144. The fourth condensed water return line 164 is coupled to the fourth flasher supplied water line 144 on an upstream side of the fourth flasher supplied water valve 144a. The fourth condensed water return line 164 is provided with a fourth condensed water feed pump 174. The fourth condensed water feed pump 174 is a pressurizer configured to pressurize the fourth condensed water generated by the fourth flasher 214. The fourth condensed water return line 164 is provided with the third extracted air cooler 83 on a downstream side of the fourth condensed water feed pump 174. Therefore, the third extracted air cooler 83 subjects the fourth condensed water pumped through the fourth condensed water return line 164 by the fourth condensed water feed pump 174 and the extracted air that is extracted from the front stage of the compressor 11 to heat exchange. As a result, the extracted air is cooled, and the fourth condensed water is also heated. Therefore, the third extracted air cooler 83 also functions as a heat source heating the fourth condensed water.

According to the combined cycle plant 1F including the steam turbine system 200F, the first extracted air cooler 81 heats the first condensed water by using heat of the extracted air from the compressor 11. The heated first condensed water is mixed with the low-pressure heated water flowing through the first flasher supplied water line, and thus a flow rate of the low-pressure heated water supplied to the first flasher 211 such that a temperature thereof increases. Similarly, the second extracted air cooler 82 and the third extracted air cooler 83 heat the third condensed water and the fourth condensed water by using heat of the extracted air from the compressor 11, and then return the heated condensed water to the upstream side. Consequently, a flow rate of water supplied to the third flasher 213 and the fourth flasher 214 increases, and thus temperatures thereof increase. Consequently, it is possible to effectively use heat exhausted from the first extracted air cooler 81, the second extracted air cooler 82, and the third extracted air cooler 83 and thus to improve the efficiency of the combined cycle plant 1F.

Other Modification Examples of Embodiments

As mentioned above, the embodiments of the repetition information have been described with reference to the drawings, but the respective configurations and combinations thereof in the respective embodiments are only examples, and additions, omissions, and replacements of configurations, and other modifications may occur within the scope without departing from the concept of the present invention. The present invention is not limited to the embodiments, and is limited by only the claims.

Therefore, configurations of the embodiments of the present invention are not limited to any one of the first embodiment to the seventh embodiment, such as a combination of the configurations of the first embodiment and the second embodiment.

The saturated steam generation portion is not limited to the configuration in which a flash steam generated by the flasher is supplied as a saturated steam or the configuration in which a saturated steam is supplied by using the exhaust heat recovery boiler 100, as in the present embodiment. The saturated steam generation portion 210 may have any configuration in which a saturated steam can be fed into the wet region C1.

The saturated steam generation portion is not limited to the configuration in which a plurality of saturated steams under different conditions can be supplied as in the multi-stage flasher of the present embodiment. The saturated steam generation portion may be configured to generate only a saturated steam fed into the wet region C1.

The exhaust heat recovery boiler 100 is not limited to the configuration of the present embodiment. Therefore, the exhaust heat recovery boiler 100 may further include other economizers, evaporators, superheaters, or reheaters, and, conversely, may not include some economizers, evaporators, superheaters, or reheaters.

INDUSTRIAL APPLICABILITY

According to the present invention, it is possible to limit the occurrence of erosion.

REFERENCE SIGNS LIST 1, 1A, 1B, 1C, 1D, 1E, AND 1F COMBINED CYCLE PLANT
10 GAS TURBINE
11 COMPRESSOR
20 COMBUSTOR
30 TURBINE
13 GAS TURBINE ROTOR
14 FIRST BEARING
15 FIRST GENERATOR
A AIR
100 EXHAUST HEAT RECOVERY BOILER
101 BOILER OUTER FRAME
102 LOW-TEMPERATURE HEAT EXCHANGER
103 LOW-PRESSURE ECONOMIZER
104 AND 104E LOW-PRESSURE EVAPORATOR
105 LOW-PRESSURE SUPERHEATER
106 INTERMEDIATE-PRESSURE REHEATER
107 HIGH-PRESSURE ECONOMIZER
108 HIGH-PRESSURE EVAPORATOR
109 HIGH-PRESSURE SUPERHEATER
111 FIRST HEATED WATER LINE
112 SECOND HEATED WATER LINE
113 THIRD HEATED WATER LINE
115 HIGH-PRESSURE PUMP
121 FIRST STEAM LINE
114 FOURTH HEATED WATER LINE
122 SECOND STEAM LINE
129 CHIMNEY
128 FLUE 200, 200B, 200C, 200D, 200E, AND 200F STEAM TURBINE SYSTEM
60 STEAM TURBINE
601 HIGH-PRESSURE STEAM TURBINE
602 INTERMEDIATE-PRESSURE STEAM TURBINE
603, 603B, AND 603C LOW-PRESSURE STEAM TURBINE
C MAIN FLOW PATH
C WET REGION
61 STEAM TURBINE ROTOR
62 ROTOR SHAFT
63 ROTOR BLADE LOW
630 ROTOR BLADE
64 AND 64B STEAM TURBINE CASING
65 STATOR VANE ROW
650 STATOR VANE
210, 210B, 201C, 210D, 210E, AND 210F SATURATED STEAM GENERATION PORTION
211 FIRST FLASHER
212 SECOND FLASHER
213 AND 213D THIRD FLASHER
214 FOURTH FLASHER
220 SECOND BEARING
230 SECOND GENERATOR
240 CONDENSER
70 AND 70A WATER SUPPLY SYSTEM
71, 71A, AND 71D SUPPLIED WATER LINE
79 WATER SUPPLY PUMP
131 HIGH-PRESSURE STEAM LINE
132 HIGH-PRESSURE EXHAUST AIR LINE
133 INTERMEDIATE-PRESSURE STEAM LINE
134 INTERMEDIATE-PRESSURE EXHAUST AIR LINE
135 LOW-PRESSURE STEAM LINE
136 LOW-PRESSURE EXHAUST AIR LINE
141 FIRST FLASHER SUPPLIED WATER LINE
141a FIRST FLASHER SUPPLIED WATER VALVE
151 FIRST SATURATED STEAM LINE
142 SECOND FLASHER SUPPLIED WATER LINE
142a SECOND FLASHER SUPPLIED WATER VALVE
152 SECOND SATURATED STEAM LINE
143 THIRD FLASHER SUPPLIED WATER LINE
143a THIRD FLASHER SUPPLIED WATER VALVE
153 THIRD SATURATED STEAM LINE
144 FOURTH FLASHER SUPPLIED WATER LINE
144a FOURTH FLASHER SUPPLIED WATER VALVE
154 FOURTH SATURATED STEAM LINE
155 AND 155D CONDENSED WATER EXHAUST LINE
155a CONDENSED WATER EXHAUST PUMP
40 INTAKE AIR COOLER
41 INTAKE AIR HEAT EXCHANGER
42 INTAKE AIR REFRIGERATOR
50 COOLING AIR COOLER
51 FIRST AIR COOLER
52 SECOND AIR COOLER
53 THIRD AIR COOLER
16 FIRST GENERATOR COOLER
17 FIRST LUBRICANT COOLER
66 SECOND GENERATOR COOLER
67 SECOND LUBRICANT COOLER
78 SUPPLIED WATER HEATER
72 FIRST SUPPLIED WATER LINE
73 SECOND SUPPLIED WATER LINE
74 THIRD SUPPLIED WATER LINE
75 FOURTH SUPPLIED WATER LINE
77 SUB-COOLER
69 SATURATED STEAM INTRODUCING PORTION
631 TIP END
69C SATURATED STEAM INTRODUCING PORTION
650C STATOR VANE
651 HOLLOW PORTION
652 SUPPLY PORT
653 FRONT EDGE PORTION
301 LOW-TEMPERATURE AND LOW-PRESSURE ECONOMIZER
302 LOW-TEMPERATURE AND LOW-PRESSURE EVAPORATOR
303 LOW-TEMPERATURE AND LOW-PRESSURE HEATED WATER LINE
304 LOW-TEMPERATURE AND LOW-PRESSURE SATURATED STEAM LINE
305 SUPPLIED WATER BRANCH LINE
305a BRANCH LINE PUMP
401 LOW-PRESSURE SATURATED STEAM LINE
80 EXTRACTED AIR COOLER
81 FIRST EXTRACTED AIR COOLER
82 SECOND EXTRACTED AIR COOLER
83 THIRD EXTRACTED AIR COOLER
161 FIRST CONDENSED WATER RETURN LINE
163 THIRD CONDENSED WATER RETURN LINE
164 FOURTH CONDENSED WATER RETURN LINE
171 FIRST CONDENSED WATER FEED PUMP
173 THIRD CONDENSED WATER FEED PUMP
174 FOURTH CONDENSED WATER FEED PUMP

The invention claimed is:

1. An exhaust heat recovery plant comprising:
a saturated steam generation portion that is configured to generate a saturated first steam;
an exhaust heat recovery boiler that is configured to generate a second steam by using heat of an exhaust gas; and
a steam turbine system including a steam turbine in which a main flow path through which a main steam flows is formed, and that is configured to feed the saturated first steam into a wet region in which the main steam in the main flow path is in a wet state,
wherein the saturated steam generation portion is configured to generate, as the saturated first steam, a flash steam obtained by flashing a first water generated by the exhaust heat recovery boiler, and
wherein the exhaust heat recovery plant is configured to heat a second water flowing through a water supply system using a heat source other than the exhaust gas, the water supply system being configured to supply the second water directly to the exhaust heat recovery boiler or indirectly to the exhaust heat recovery boiler via a heat exchanger.

2. A combined cycle plant comprising:
the exhaust heat recovery plant according to claim 1; and
a gas turbine,
wherein the exhaust gas is from the gas turbine and is supplied to the exhaust heat recovery boiler of the exhaust heat recovery plant, and
wherein the exhaust heat recovery boiler is configured to generate the second steam by using heat of the exhaust gas from the gas turbine.

3. The combined cycle plant according to claim 2, further comprising:
a generator that is configured to generate electric power due to driving the steam turbine,
wherein the water supply system is configured to supply the second water directly to the exhaust heat recovery boiler, wherein the gas turbine includes a compressor that is configured to compress an air, a combustor that is configured to burn a fuel in the air compressed by the compressor and thereby generate a combustion gas, and a turbine that is driven with the combustion gas, wherein the water supply system includes a supplied water line through which the second water from a water source is fed to the exhaust heat recovery boiler, and a supplied water heater that is configured to heat the second water flowing through the supplied water line, wherein the supplied water heater includes at least one of an intake air cooler that is configured to subject a first cooling medium cooling the air sucked by the compressor and the second water to heat exchange, and thus cool the first cooling medium and heats the second water, a gas turbine cooler that is configured to subject a second cooling medium cooling a constituent component of the gas turbine and the second water to heat exchange, and thus cool the second cooling medium and heat the second water, a lubricant cooler that is configured to subject a lubricant from a plurality of bearings rotatably supporting a rotor of the steam turbine and the second water to heat exchange, thus cool the lubricant and heats the second water, and returns the cooled lubricant to the plurality of bearings, and a generator cooler that is configured to subject a third cooling medium cooling a constituent component of the generator and the second water to heat exchange, and thus cool the third cooling medium and heats the second water, and wherein the saturated steam generation portion is configured to feed a condensed water generated by flashing the first water to the exhaust heat recovery boiler along with the second water supplied from the supplied water heater to the exhaust heat recovery boiler.

4. The combined cycle plant according to claim 3,
wherein the heat source is the gas turbine cooler that is configured to subject the condensed water and the second cooling medium cooling the constituent component of the gas turbine to heat exchange, and thus cool the second cooling medium and heat the condensed water.

5. The exhaust heat recovery plant according to claim 1,
wherein the saturated steam generation portion is a multi-stage flasher that is configured to convert the first water into the flash steam over a plurality of times while gradually depressurizing the first water.

6. The exhaust heat recovery plant according to claim 1,
wherein the saturated steam generation portion includes a flasher that is configured to generate the flash steam by depressurizing the first water, and
wherein the exhaust heat recovery plant further comprises a pressurizer configured to pressurize a condensed water generated by the flasher, and the heat source heating the condensed water pressurized by the pressurizer, and
wherein the exhaust heat recovery plant is configured to return the condensed water heated by the heat source to the flasher.

7. The exhaust heat recovery plant according to claim 1,
wherein the saturated steam generation portion is configured to generate a low-pressure saturated steam fed into the wet region and a high-pressure saturated steam having a pressure higher than a pressure of the low-pressure saturated steam as the saturated first steam, and feed the high-pressure saturated steam into an upstream region with respect to the wet region in the main flow path.

8. The exhaust heat recovery plant according to claim 1,
wherein the saturated steam generation portion is a multi-stage flasher that is configured to convert the first water into the flash steam over a plurality of times while gradually depressurizing the first water.

9. The exhaust heat recovery plant according to claim 1,
wherein the exhaust heat recovery boiler includes an economizer that is configured to heat the second water supplied from the water supply system with the exhaust gas, an evaporator that is configured to heat the second water heated by the economizer with the exhaust gas and thereby generate a third steam, and a superheater that is configured to superheat the third steam generated by the evaporator with the exhaust gas, and
wherein the saturated steam generation portion is configured to flash the second water supplied from the economizer.

10. The exhaust heat recovery plant according to claim 9,
wherein the exhaust heat recovery boiler includes a heat exchanger that is configured to heat the second water supplied from the water supply system with the exhaust gas having passed through the economizer and is configured to supply the heated second water to the economizer, and
wherein the saturated steam generation portion is configured to feed a condensed water generated by flashing the first water to the economizer along with the second water supplied from the heat exchanger to the economizer.

11. The exhaust heat recovery plant according to claim 1,
wherein the saturated steam generation portion is configured to supply the saturated first steam into the main flow path from an upstream side with respect to a rotor blade of the steam turbine toward a tip end of the rotor blade.

12. A combined cycle plant comprising:
the exhaust heat recovery plant according to claim 1; and
a gas turbine,
wherein the exhaust gas is from the gas turbine and is supplied to the exhaust heat recovery boiler of the exhaust heat recovery plant, and
wherein the exhaust heat recovery boiler is configured to generate the second steam by using heat of the exhaust gas from the gas turbine.

13. The exhaust heat recovery plant according to claim 1,
wherein the water supply system is configured to supply the second water having a temperature lower than a dew point temperature of the exhaust gas exhausted from the exhaust heat recovery boiler.

14. The exhaust heat recovery plant according to claim 13,
wherein the exhaust heat recovery boiler includes a low-temperature heat exchanger,
wherein the low-temperature heat exchanger is configured to condense part of moisture in the exhaust gas and increase a heat recovery amount.

15. A combined cycle plant comprising:
the exhaust heat recovery plant according to claim 13; and
a gas turbine,
wherein the exhaust gas is from the gas turbine and is supplied to the exhaust heat recovery boiler of the exhaust heat recovery plant.

16. An exhaust heat recovery plant comprising:
a saturated steam generation portion that is configured to generate a saturated first steam; and an exhaust heat recovery boiler that is configured to generate a second steam by using heat of an exhaust gas, wherein the saturated steam generation portion is configured to generate, as the saturated first steam, a flash steam obtained by flashing a first water generated by the exhaust heat recovery boiler, wherein the exhaust heat recovery plant is configured to heat at least one of a second water flowing through a water supply system which is configured to supply the second water to the exhaust heat recovery boiler or a condensed water generated by flashing the first water, using a heat source other than the exhaust gas, wherein the exhaust heat recovery boiler includes an economizer that is configured to heat the second water with the exhaust gas, wherein the economizer is heating the second water heated by the heat source other than the exhaust gas with the exhaust gas, wherein the saturated steam generation portion is configured to generate the saturated first steam by flashing the second water heated by the economizer, wherein the exhaust heat recovery boiler includes a plurality of evaporators, and wherein the economizer supplies the second water to an evaporator arranged on the most downstream of a flow of the exhaust gas among the plurality of evaporators.

17. A combined cycle plant comprising:
the exhaust heat recovery plant according to claim 16; and
a gas turbine,
wherein the exhaust gas is from the gas turbine and is supplied to the exhaust heat recovery boiler of the exhaust heat recovery plant, and wherein the exhaust heat recovery boiler is configured to generate the second steam by using heat of the exhaust gas from the gas turbine.

18. An exhaust heat recovery plant comprising:
a saturated steam generation portion that is configured to generate a saturated first steam; and
an exhaust heat recovery boiler that is configured to generate a second steam by using heat of an exhaust gas, wherein the saturated steam generation portion is configured to generate, as the saturated first steam, a flash steam obtained by flashing a first water generated by the exhaust heat recovery boiler, wherein the exhaust heat recovery plant is configured to heat at least one of a second water flowing through a water supply system which is configured to supply the second water to the exhaust heat recovery boiler or a condensed water generated by flashing the first water, using a heat source other than the exhaust gas, wherein the exhaust heat recovery boiler includes an economizer that is configured to heat the second water with the exhaust gas, wherein the economizer is heating the second water heated by the heat source other than the exhaust gas with the exhaust gas, wherein the saturated steam generation portion is configured to generate the saturated first steam by flashing the second water heated by the economizer, wherein the saturated steam generation portion is configured to feed the condensed water generated by flashing the first water to the economizer, and wherein the economizer is supplied by mixing the second water heated by the heat source other than the exhaust gas and the condensed water.

* * * * *